(12) United States Patent
Gupta et al.

(10) Patent No.: US 12,277,028 B2
(45) Date of Patent: Apr. 15, 2025

(54) ERROR CORRECTION CODE

(71) Applicant: Arm Limited, Cambridge (GB)

(72) Inventors: Siddharth Gupta, Noida (IN); Antony John Penton, Bishop's Stortford (GB)

(73) Assignee: Arm Limited, Cambridge (GB)

( * ) Notice: Subject to any disclaimer, the term of this patent is extended or adjusted under 35 U.S.C. 154(b) by 78 days.

(21) Appl. No.: 18/364,764

(22) Filed: Aug. 3, 2023

(65) Prior Publication Data
US 2025/0045155 A1    Feb. 6, 2025

(51) Int. Cl.
*G06F 11/10* (2006.01)

(52) U.S. Cl.
CPC ...... *G06F 11/1044* (2013.01); *G06F 11/1016* (2013.01); *G06F 11/1048* (2013.01)

(58) Field of Classification Search
CPC .. G06F 11/10; G06F 11/1016; G06F 11/1044; G06F 11/1048; H03M 13/00; H03M 13/13; H03M 13/19
See application file for complete search history.

(56) References Cited

U.S. PATENT DOCUMENTS

| | | | | |
|---|---|---|---|---|
| 8,516,339 B1* | 8/2013 | Lesea | ................ | H03M 13/2906 714/763 |
| 9,450,613 B2* | 9/2016 | Kern | .................... | H03M 13/159 |
| 10,200,065 B2* | 2/2019 | Kern | ................ | H03M 13/6575 |
| 2008/0109705 A1* | 5/2008 | Pawlowski | ......... | G06F 11/1044 714/767 |
| 2015/0143201 A1* | 5/2015 | Coteus | ................ | G06F 11/1012 714/773 |
| 2016/0134307 A1* | 5/2016 | Hu | ...................... | G06F 11/1048 714/758 |
| 2017/0075619 A1 | 3/2017 | Jones | | |

OTHER PUBLICATIONS

Office Action dated Nov. 8, 2024 for U.S. Appl. No. 18/364,648, 10 pages.
"Arm CoreLink CMN-600AE Coherent Mesh Network", Arm, Technical Reference Manual, Revision: r1p0, Issue 05, Document ID: 101408_0100_05_en, 2019-2022, 6 pages.
M. Y. Hsiao, "A Class of Optimal Minimum Odd-weight-column SEC-DED Codes", Jul. 1970, 7 pages.
U.S. Appl. No. 18/364,648, filed Aug. 3, 2023, Gupta et al.

* cited by examiner

*Primary Examiner* — Joseph O Schell
(74) *Attorney, Agent, or Firm* — NIXON & VANDERHYE P.C.

(57) ABSTRACT

An apparatus comprises a storage configured to store data items associated with error correction codes (ECCs); data retrieval circuitry responsive to a data retrieval request specifying a retrieval address to retrieve a retrieved data item and an associated ECC from a storage location corresponding to the retrieval address; and ECC decoding circuitry to generate a syndrome value by performing an ECC decoding operation on a decoding input value comprising data bits of the retrieved data item, code bits of the associated ECC, and address bits of the retrieval address, and to determine based on the syndrome value whether an error condition has occurred. Each bit of the syndrome value depends on a different combination of bits of the decoding input value. For each data bit of the decoding input value, an odd number of bits of the syndrome value depend on that data bit. For each address bit of the decoding input value, an even number of bits of the syndrome value depend on that address bit.

18 Claims, 16 Drawing Sheets

Address digest generation

Address digest check

ERROR CORRECTION CODE

BACKGROUND

Technical Field

The present technique relates to the field of storage of data items.

Technical Background

An apparatus may have storage for storing data items associated with error correction codes (ECCs). An ECC helps protect against randomly occurring errors which cause one or more bits of the stored data item to change state. The ECC is computed from the data item when storing the data item to the storage. When reading a data item from the storage, the ECC and the data item are decoded to determine whether an error condition has occurred.

SUMMARY

At least some examples of the present technique provide an apparatus comprising:
  a storage configured to store data items associated with error correction codes (ECCs); and
  data retrieval circuitry responsive to a data retrieval request specifying a retrieval address to retrieve a retrieved data item and an associated ECC from a storage location corresponding to the retrieval address; and
  ECC decoding circuitry to generate a syndrome value by performing an ECC decoding operation on a decoding input value comprising data bits of the retrieved data item, code bits of the associated ECC, and address bits of the retrieval address, and to determine based on the syndrome value whether an error condition has occurred, in which:
  each bit of the syndrome value depends on a different combination of bits of the decoding input value;
  for each data bit of the decoding input value, an odd number of bits of the syndrome value depend on that data bit; and
  for each address bit of the decoding input value, an even number of bits of the syndrome value depend on that address bit.

At least some examples of the present technique provide a system comprising:
  the apparatus described above, implemented in at least one packaged chip;
  at least one system component; and
  a board,
  wherein the at least one packaged chip and the at least one system component are assembled on the board.

At least some examples of the present technique provide a chip-containing product comprising the system described above assembled on a further board with at least one other product component.

At least some examples of the present technique provide a non-transitory computer-readable medium to store computer-readable code for fabrication of an apparatus comprising:
  a storage configured to store data items associated with error correction codes (ECCs); and
  data retrieval circuitry responsive to a data retrieval request specifying a retrieval address to retrieve a retrieved data item and an associated ECC from a storage location corresponding to the retrieval address; and
  ECC decoding circuitry to generate a syndrome value by performing an ECC decoding operation on a decoding input value comprising data bits of the retrieved data item, address bits of the retrieval address and code bits of the associated ECC, and to determine based on the syndrome value whether an error condition has occurred, in which:
  each bit of the syndrome value depends on a different combination of bits of the decoding input value;
  for each data bit of the decoding input value, an odd number of bits of the syndrome value depend on that data bit; and
  for each address bit of the decoding input value, an even number of bits of the syndrome value depend on that address bit.

At least some examples of the present technique provide a method comprising:
  in response to a data retrieval request specifying a retrieval address, retrieving a retrieved data item and an associated error correction code (ECC) from a storage location corresponding to the retrieval address;
  generating a syndrome value by performing an ECC decoding operation on a decoding input value comprising data bits of the retrieved data item, address bits of the retrieval address and code bits of the associated ECC; and
  determining based on the syndrome value whether an error condition has occurred; in which:
  each bit of the syndrome value depends on a different combination of bits of the decoding input value;
  for each data bit of the decoding input value, an odd number of bits of the syndrome value depend on that data bit; and
  for each address bit of the decoding input value, an even number of bits of the syndrome value depend on that address bit.

Further aspects, features and advantages of the present technique will be apparent from the following description of examples, which is to be read in conjunction with the accompanying drawings.

BRIEF DESCRIPTION OF THE DRAWINGS

FIGS. 5 and 6 illustrate examples of a generator matrix and a parity check matrix respectively, constructed according to Hsiao matrix generation principles;

FIGS. 7 and 8 illustrate examples of a generator matrix and parity check matrix in which columns corresponding to data bits are odd-weighted and columns corresponding to address bits are even-weighted;

FIGS. 9 and 10 illustrate further examples of a generator matrix and parity check matrix with even-weighted columns corresponding to address bits, for an example where the ECC has an odd number of code bits;

FIGS. 11 and 12 illustrate unusable reserved matrix codes which are not used for columns corresponding to data bits;

DESCRIPTION OF EXAMPLES

Error Correction Codes

Figure 1:
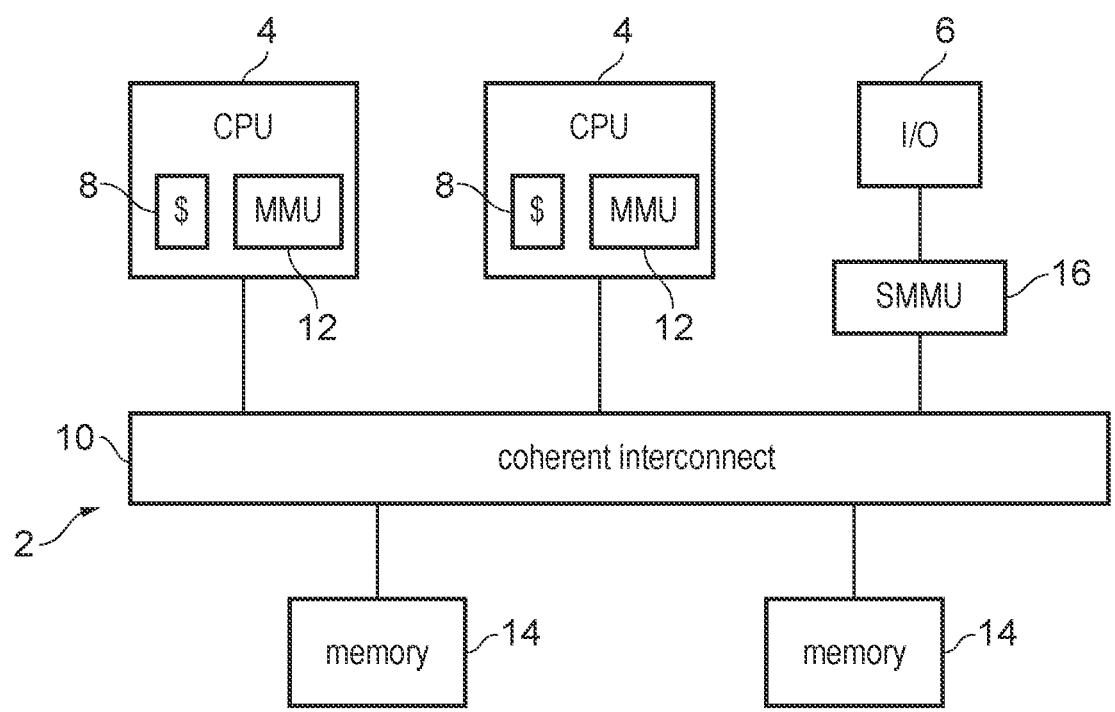
FIG. 1 illustrates an example of an apparatus having storage for storing data items.

An apparatus comprises a storage configured to store data items associated with error correction codes (ECCs); data retrieval circuitry responsive to a data retrieval request specifying a retrieval address to retrieve a retrieved data item and an associated ECC from a storage location corresponding to the retrieval address; and ECC decoding circuitry to generate a syndrome value by performing an ECC decoding operation on a decoding input value comprising at least data bits of the retrieved data item, code bits of the associated ECC, and to determine based on the syndrome value whether an error condition has occurred. The syndrome value can be used to determine how to respond to an error, such as by correcting an erroneous bit identified in the data item based on the syndrome value, or signalling a fatal error if the syndrome value indicates that the error is not correctable.

One approach to performing ECC decoding is to calculate the syndrome value so that each bit of the syndrome depends on a different combination of bits of the decoding input value. In a typical scheme, for each bit of the decoding input value, an odd number of bits of the syndrome value depend on that bit. This property helps to ensure that single bit errors (where only a single bit of the decoding input value is erroneous) can be distinguished from double bit errors where two bits are each erroneous. This approach can be used in use cases where, on writing the data item to the storage, the ECC is computed from the data bits of the retrieved data item, but is independent of the associated address of the location at which the data item is to be stored.

Folding at least a portion of bits of the address of the data item into ECC encoding and ECC decoding operations can be helpful to provide protection against errors affecting the operation of the address decoder used to select which location of the storage is read/written. Hence, in implementation supporting such "address folding" ECCs, one might expect that the same principles can be used as in ECCs which do not depend on the address, with any address bits included in the ECC computation simply treated as additional data bits. Hence, one might assume that for the address bits, during ECC decoding there should also be an odd number of bits of the syndrome value depending on each address bit.

In contrast, the inventors have proposed a different scheme where for each address bit of the decoding input value subject to ECC decoding, an even number of bits of the syndrome value depend on the address bit. This is counterintuitive because conventional wisdom would be that all bits of the decoding input value should affect an odd number of bits of the syndrome value to ensure that double-bit errors can be distinguished from single bit errors.

However, the inventors have recognised that, in practice errors affecting address bits are caused by faults affecting the address decoding logic, which may be physically separated from the data storage circuitry which is storing the data item, and so two physically separate events, each having a relatively low probability, would be needed for both an address bit error and a data bit error to affect the same read operation for reading out a data item from the storage circuitry. As the probability of simultaneous address decode and data storage faults is negligible, it is not valuable to be able to distinguish dual-bit errors affecting one data bit and one address bit in the syndrome value, and so the available encodings in the syndrome value can be better used for detection of single-bit or multi-bit data bit errors occurring without any address bit error or single-bit or multi-bit address errors occurring without any data bit error.

As discussed in more detail below, by processing the address bits of the decoding input value so that each address bit affects an even number of bits of the syndrome value, this can provide higher detection rates for multi-address-bit errors than a standard ECC scheme. Another advantage is that, for a given number of code bits of the ECC and a given number of address bits to be protected using the ECC, the maximum number of data bits that can be protected against single-bit and dual-bit errors by the ECC can be increased compared to the standard ECC scheme. Therefore, an approach which has an even number of bits of the syndrome value depending on each address bit of the decoding input value can provide greater error protection than alternative schemes.

The ECC decoding circuitry may determine each bit of the syndrome value by applying a parity checking function to a corresponding combination of bits of the decoding input value. Using parity computations for determining each syndrome value bit can be simple to implement in hardware, and provides the property that if any one bit of the combination of bits used to compute a given syndrome bit changes state, the corresponding syndrome bit will also change state enabling detection of the error. The parity checking may be based on either an odd parity checking function or an even parity checking function, or a combination of both with some bits of the ECC being subject to checking using an odd parity checking function and others subject to checking based on an even parity checking function. For an odd parity checking function, the parity bit computed during ECC encoding and the corresponding combination of bits from which that parity bit was computed should have an odd number of 1s. For an even parity checking function, the parity bit computed during ECC encoding and the corresponding combination of from which that parity bit was computed should have an even number of 1s.

In some examples, in response to the data bits of the retrieved data item and the code bits of the associated ECC having all bits equal to 0 or all bits equal to 1, the ECC decoding circuitry is configured to determine the syndrome value as indicating that an error condition has occurred. Faults leading to all bits being stuck at 0 or all bits being stuck at 1 may occur for a variety of reasons in some random access memory designs. For example, these could arise if no word lines get activated, which might cause a multiplexer for outputting the retrieved information to return all zero when no word lines are selected. Faults in timing circuitry or reference voltage circuitry might have a similar effect. Therefore, a fault causing all bits to be 0 or all bits to be 1 may be an additional cause of error, separate from other faults which might cause one bit or a relatively small number of stored bits to incorrectly flip state. Therefore, to support detection of stuck at 0 faults, it can be useful to implement the ECC scheme so that the combination of data item and associated ECC having all bits equal to 0 (in both data item and ECC) is treated as an erroneous encoding. Similarly, to support detection of stuck at 1 faults, the ECC scheme may be such that the combination of data item and associated ECC having all bits equal to 1 (in both data item and ECC) is treated as an erroneous encoding. Hence, the ECC decoding circuitry may determine the syndrome value as indicating an error condition if all bits of both the retrieved data item and the associated ECC are either all 0 or all 1. It is not necessary to signal the error if only one of the data item and the ECC has all-0 or all-1 value. For example, a data item with an all-0 value may be valid in combination with a non-0 ECC value, and an all-0 ECC value may be a valid ECC associated with a non-0 value of the data item.

In some examples, the ECC decoding circuitry determines at least one selected bit of the syndrome value independent of all of the address bits of the decoding input value. This can be helpful to support the stuck-at-0 detection. Other bits of the syndrome value depend on a selected subset of address bits, with different combinations of address bits used for the other bits.

As mentioned above, each bit of the syndrome value may be determined by applying a parity checking function to a corresponding combination of bits of the decoding input value. In some examples, for a first subset of bits of the syndrome value, the ECC decoding circuitry applies a first parity checking function, and for a second subset of bits of the syndrome value, the ECC decoding circuitry applies a second parity checking function. For example, the first parity checking function and second parity checking function could be an odd parity checking function and an even parity checking function respectively, or vice versa. The first parity checking function could be based on an XOR function and the second parity checking function could be based on an XNOR function (or vice versa). The combination of one parity checking function for some syndrome bits and a different parity checking function for other syndrome bits can help to support the stuck-at-0 and stuck-at-1 fault detection, to prevent all-0 or all-1 combinations of data and ECC value being treated as valid code symbols.

For each data bit of the decoding input value, a combination of bits of the syndrome value which depend on that data bit may be a unique combination different from the combination of bits of the syndrome value which depend on any other data bit of the decoding input value. This helps to provide the property where each single bit data error corresponds to a different encoding of the syndrome value, allowing the erroneous bit to be identified and corrected.

One way of representing the respective combinations of bits of the syndrome value which depend on a given bit of the decoding input value is as a parity check matrix where each column of the matrix corresponds to one bit of the decoding input value and indicates the combination of syndrome bits which depend on that bit of the decoding input value, and each row of the matrix corresponds to one syndrome bit and indicates the combination of bits of the decoding input value on which the parity computation for generating that syndrome bit depends. The parity check matrix is a logical construct, and represents the pattern of bit combinations used to generate the syndrome value from the decoding input value. In practice, the parity check matrix does not need to be provided as an operand of the ECC decoding operation. Rather the parity check matrix can be a representation of the pattern of interconnections implemented in hardware in the ECC decoding circuitry to control which bits are combined to form each syndrome bit.

For each data bit of the decoding input value, the combination of bits of the syndrome value which depend on that data bit can be logically represented as a column value with positions of 1s in the column value indicating which bits of the syndrome value depend on the given data bit. It can be useful if the ECC decoding circuitry determines the syndrome value according to a scheme whereby the exclusive XOR of column values for any two of the data bits of the decoding input value is different to the column value for any one of the data bits of the decoding input value. This provides support for detecting dual-bit data errors where two bits of the data item are erroneous.

The ECC decoding circuitry uses the syndrome value to determine whether an error condition has occurred and how to handle the error.

The ECC decoding circuitry is responsive to detecting that the syndrome value comprises a non-zero even number of bits set to 1, to signal a fatal error in the requested data retrieval. With the approach described above where data bits influence computation of an odd number of syndrome value bits and address bits influence computation of an even number of syndrome value bits, the syndrome value having a non-zero even number of bits set to 1 may indicate either a multi-bit data error affecting a non-zero even number of data bits, or a single- or multi-bit address error affecting one or more address bits. Either way, such an error cannot be corrected simply by flipping the state of one of the data bits, and so a fatal error may be signalled. This may for example cause an exception to be raised to software to trigger software to handle the error (e.g. by restarting program execution from an earlier point).

The ECC decoding circuitry may be responsive to the fatal error to block the outputting of the retrieved data item. This prevents the erroneous data item being used for subsequent processing.

The ECC decoding circuitry may be responsive to detecting that the syndrome value comprises one of a plurality of single-data-error-indicating values having an odd number of bits set to 1, to perform, based on the syndrome value, a correction operation on the retrieved data item, and to output a corresponding corrected data item. With the scheme above where odd numbers of syndrome bits depend on each data bit but even numbers of syndrome bits depend on each address bit, the syndrome value having an odd number of bits may (if the syndrome value pattern corresponds to the column value for a corresponding one of the data bits) indicate a single bit error in a particular data bit, so that it is not necessary to signal a fatal error as the error can be fixed by correcting the particular bit. Hence, the ECC decoding circuitry may perform the correction operation by: determining, based on the syndrome value, an erroneous bit of the retrieved data value; and flipping the erroneous bit (e.g. switching the erroneous bit from 0 to 1 or from 1 to 0).

In some cases, all the possible syndrome values which have an odd number of bits set to 1 may indicate corresponding single-bit data errors (and so any syndrome value with an odd number of bits set to 1 may be considered one of the single-data-error-indicating values).

In other examples (e.g. if the number of data bits being protected by the ECC is less than the maximum number of data bits which could be protected under the ECC scheme), only a subset of the possible syndrome values which have an odd number of bits set to 1 may correspond to single-data-bit errors, and so other syndrome values with an odd number of bits set to 1 may not be considered to be one of the plurality of single-data-error-indicating values, and so may trigger a different response (e.g. signalling of a fatal error).

The ECC decoding circuitry may be responsive to the syndrome value having a zero value to determine that no error condition has occurred. For example, the syndrome computation may combine, for each syndrome bit, a corresponding bit of the ECC with the combination of data/address bits at the same positions within the data item and address as data/address bits which were used in the previous ECC encoding operation when the ECC was generated. This means that, if no error has occurred (the stored data item matches the original data item written to the location, and the retrieval address matches an address provided when the data item was written to the location), one would expect each syndrome bit to be zero. Implementing the ECC scheme so that an all-zero syndrome value indicates no error condition can simplify the ECC decoding circuit logic compared to alternative encodings of the no error condition state.

The apparatus may also have ECC encoding circuitry to receive a data item to be stored in the storage, the received data item having an associated address, and to perform an ECC encoding operation on an encoding input value comprising data bits of the received data item and address bits of the associated address, to generate the corresponding ECC to be stored to the storage in association with the received data value; wherein: for each data bit of the encoding input value, an odd number of bits of the corresponding ECC depend on that data bit; and for each address bit of the encoding input value, an even number of bits of the corresponding ECC depend on that address bit. Hence, the ECC encoding operation has corresponding properties to the ECC decoding operation, supporting increased detection rate for multi-address bit errors and an increase in the maximum number of data bits protectable using a given number of ECC code bits, compared to alternative address-folding-based ECC encoding schemes where each address bit affects an odd number of ECC bits.

The ECC encoding operation may have corresponding properties to the ECC decoding operation described above, to provide support for detection of stuck-at-0 or stuck-at-1 faults, single-data-error correction capability, single/multi-address-error detection capability, and multi-data-error detection capability.

Hence, the ECC encoding circuitry may generate the corresponding ECC according to an ECC encoding scheme which prevents a stored value, comprising the data bits of the received data item and a plurality of code bits of the corresponding ECC, having all bits equal to 0 or all bits equal to 1. The ECC encoding circuitry may determine at least one selected bit of the corresponding ECC independent of all of the address bits of the encoding input value. The ECC encoding circuitry may determine each bit of the corresponding ECC as a parity value indicative of parity of a corresponding combination of bits of the encoding input value. For a first subset of bits of the corresponding ECC, the ECC encoding circuitry may determine the parity value by applying a first parity determining function. For a second subset of bits of the corresponding ECC, the ECC encoding circuitry may determine the parity value by applying a second parity determining function. For example, the first and second parity determining functions may be odd parity and even parity respectively, or could be based on XOR and XNOR functions respectively. For each data bit of the encoding input value, a combination of bits of the corresponding ECC which depend on that data bit may be a unique combination different from the combination of bits of the syndrome value which depend on any other data bit of the decoding input value. The ECC encoding circuitry may determine the ECC wherein, if for each data bit of the encoding input value the combination of bits of the corresponding ECC which depend on that data bit is logically represented as a column value with positions of is in the column value indicating which bits of the corresponding ECC depend on the given data bit, the exclusive XOR of column values for any two of the data bits of the encoding input value is different to the column value for any one of the data bits of the encoding input value.

In some examples, the ECC encoding circuitry may: compute one or more parity bits associated with said associated address; perform the ECC encoding operation with the encoding input value also comprising the one or more parity bits, wherein for each of the one or more parity bits, an odd number of bits of the ECC depend on that parity bit; and store said one or more parity bits with the stored data item.

Similarly, the data retrieval circuitry may retrieve one or more stored parity bits from a storage location corresponding to the retrieval address; and the ECC decoding circuitry may: perform the ECC decoding operation with the decoding input value also comprising the one or more stored parity bits, wherein for each of the one or more stored parity bits, an odd number of bits of the syndrome value depend on that stored parity bit; determine based on the syndrome value whether to correct the one or more stored parity bits; and determine whether to signal an error condition depending on a comparison of one or more corrected parity bits subject to any correction based on the syndrome value with one or more retrieval parity bits computed based on at least a portion of the retrieval address.

As discussed in more detail below, including such parity bits computed from the address in the ECC encoding and ECC decoding operations can provide a further improvement in error detection rate.

Address Digest

In some examples, an apparatus comprises storage configured to store data items, and address digest generating circuitry responsive to a request to store a received data item to a location of the storage associated with a store target address, to generate an address digest based on a plurality of bits of the store target address, the address digest having fewer bits than the plurality of bits. The storage is configured to store the address digest in association with the received data item.

By computing an address digest from the store target address and storing the digest along with the data to the storage, this helps support detection of address decoding errors, which may cause the received data item to be written to or read from the wrong storage location (a storage location which does not correspond to the address specified by the source of the request). For example, randomly occurring address decoder faults may cause either a bit of the address to flip states before input to the address decoder, or the circuit logic of the address decoder to behave incorrectly so that the word lines which are asserted to control selection of the target storage location do not correspond to the address specified by the source of the request. By computing and storing an address digest at the time of storing a data item to the storage, this provides information for comparing with a corresponding address digest computed based on the retrieval address at the time of retrieving a data item from the storage, so that an address decoder error which causes the data item to be written or read at the wrong storage location (not matching the original address provided by the source of the request) can be detected. As the address digest is computed from a plurality of bits of the store target address, but has fewer bits than the plurality of bits, this conserves storage capacity in the storage, reducing the circuit area and power cost of implementing the address digest based technique.

More particularly, an address decoder fault may affect either a write access or a read access. Often when an address decoder fault occurs, the first access affected by the fault may be a read access, so that there will be a mismatch between the "wrong" storage location accessed for that read access for a given address and the "correct" storage location to which a previous write access wrote the data value associated with that given address. As the wrong storage location accessed by the read may store an address digest computed based on a different address at the time of writing, which does not correspond to the given address specified by the read access, the read access to the wrong storage location can be detected and an error can be signalled.

However, even if the first access affected by a newly occurred fault is a write access, so that the fault causes a write to a wrong storage location, then on a subsequent read access to that particular storage location, either: (i) the scheme does not detect the error based on those two accesses, but this would be acceptable as the read specified the same address as the previous write (with both computing the same address digest) and so there is no error as the correct data value would be returned, albeit from a different storage location to the one intended, or (ii) in the case where the address decoder fault causes two different addresses to map to the same storage location (one correctly and one incorrectly), that read access specifies a different address (address B) from the address (address A) subject to the previous write operation, which can be detected from mismatching address digests.

Hence, the address digest can be used to detect address decoder faults.

In some examples, the address digest may be computed from all bits of the store target address. However, in other examples, the plurality of bits used to compute the address digest may be a proper subset of bits of the store target address, so not all bits of the store target address need to be considered in the address digest computation.

The address digest may comprise a plurality of digest indicators, each digest indicator dependent on a corresponding combination of bits of the store target address. Each digest indicator may correspond to a different combination of bits of the store target address. For example, each digest indicator may comprise a parity value indicative of parity of the corresponding combination of bits of the store target address. Parity computations can be relatively efficient to implement in circuitry and enable a digest of a larger number of bits to be stored with fewer bits.

The apparatus may have address decoding circuitry to decode the store target address to select the location of the storage associated with the store target address; where the address decoding circuitry comprises a plurality of sub-decoder circuits, each sub-decoder circuit to decode a corresponding subset of bits from the store target address. The outputs of each sub-decoder circuit can be combined to produce word selection signals which select the storage location of the storage that is to be accessed for a data storage request or data retrieval request. Splitting the address decoder design into a number of sub-decoder circuits each acting on a subset of bits can simplify design implementation and make the address decoder design more scalable to different sizes of addresses.

For a given digest indicator of the address digest, the corresponding combination of bits of the store target address may comprise a plurality of bits of the store target address each decoded by a different sub-decoder circuit. This can provide better error protection compared to an approach where a given digest indicator depends on multiple bits decoded by the same sub-decoder circuit. The probability of errors simultaneously affecting multiple sub-decoders in the same read/write operation is very low and so combining bits decoded by different sub-decoders together in the same digest indicator can help reduce the number of bits required to be stored for the address digest while maintaining error detection capability.

The plurality of digest indicators may comprise at least a first digest indicator dependent on a first corresponding combination of bits at first bit positions within the store target address, and a second digest indicator dependent on a second corresponding combination of bits at second bit positions within the store target address. The first bit positions may be interleaved with the second bit positions. This can be helpful as often each sub-decoder may decode a set of contiguous bits within the address, and so interleaving the bit positions used for computing respective digest indicators can help avoid multiple bits for the same sub-decoder being combined into the same digest indicator. Hence, interleaving the bit positions used to compute each digest indicator can help improve error detection capability compared to an approach where each digest indicator is calculated from a respective set of contiguously positioned bits of the address. While the digest indicators may include at least the first digest indicator and the second digest indicator, in other examples there could also be at least one further digest indicator computed based on further bit positions interleaved with the first and second bit positions. The number of digest indicators may vary depending on the particular sub-decoder scheme used for the address decoding circuitry.

Data retrieval circuitry may be responsive to a data retrieval request specifying a retrieval address to retrieve a retrieved data item and an associated address digest from a storage location corresponding to the retrieval address. Error checking circuitry may detect an error based on a comparison of: a retrieval address digest determined based on a plurality of bits of the retrieval address (again, these plurality of bits could be either all bits of the retrieval address, or a proper subset of bits of the retrieval address); and a value dependent on the associated address digest retrieved by the data retrieval circuitry.

Hence, for retrieval of a data item for address X, one would expect that the retrieval address digest computed based on address X should match the associated address digest that was computed based on the store target address (expected to be address X) when the retrieved data item was stored to the storage. If an address decoder error occurred during the writing process, so the data item written should have been written to another storage location associated with address Y but was actually written to the location associated with address X, the associated address digest should correspond to address Y not address X, and so the mismatch between the associated address digest and retrieval address digest can be detected. On the other hand, if an address decoder error occurred during the retrieval process, so the data item is read from another storage location associated with address Z rather than the storage location associated with the retrieval address X as intended, then the associated address digest retrieved from the storage should correspond to address Z not address X, and the mismatch can be detected. Hence, address decoder errors occurring either when writing or when reading can be detected by this scheme.

As mentioned earlier, an ECC scheme can be used to protect against random errors affecting the stored data item in the period between being written to the storage and being read from the storage. In some examples, the address digest need not be considered in the ECC scheme. In some examples, the stored address digest may be unprotected by any ECC scheme. Even if the stored address digest is not protected by an ECC, the overall error detection rate can be higher in a system implementing the address digest computation/checking than in a system which does not provide the address digest at all.

However, other examples may also protect the stored address digest against random error by protecting at least some bits of the address digest using an ECC scheme. This can provide greater robustness against error by also allowing a bit flip of a stored address digest bit from 0 to 1 or 1 to 0 to be detected (and preferably corrected). Hence, ECC (error correction code) encoding circuitry may perform an ECC encoding operation on an encoding input value comprising data bits of the received data item and address digest bits of the address digest, to generate an ECC to be stored to the storage in association with the received data item and the address digest.

The ECC encoding circuitry may determine each bit of the ECC as a parity value indicative of parity of a respective combination of bits of the encoding input value.

In some examples, in the ECC encoding operation: each bit of the ECC generated in the ECC encoding operation depends on a different combination of bits of the encoding input value. For each data bit of the encoding input value, an odd number of bits of the ECC depend on that data bit. For each address digest bit of the encoding input value, an odd number of bits of the ECC depend on that address digest bit. Hence, for an ECC scheme where each data bit influences an odd number of bits of the ECC, the address digest bits folded into the ECC encoding operation may effectively be treated as additional data bits. The ECC scheme need not distinguish between data bits and digest bits.

In some examples using the address digest approach, the ECC may be generated based on the data item and the address digest, but may not depend directly on bits of the store target address itself (other than through the indirect dependency on the address digest which is itself dependent on the store target address).

In other examples, all or some address bits of the store target address may also be part of the encoding input value used to generate the ECC, so that the address bits may also directly influence the ECC computation (not just indirectly via the address digest). This can provide further robustness against errors.

If the address bits are also folded into the ECC computation, then one approach can be to use a Hsiao matrix to compute the ECC, with the data bits, address digest bits and address bits of the encoding input value all treated as "data bits" which influence an odd number of bits of the ECC.

However, as described earlier, for folding address bits into the ECC computation, it can be useful to treat the address bits differently from the data bits. Hence, where the encoding input value also comprises address bits of the store target address, for each address bit of the encoding input value an even number of bits of the ECC may depend on that address bit. This can increase error detection coverage and increase the total number of data and address digest bits that can be protected using a given number of ECC bits.

In an example where ECC computation depends on the address digest, then data retrieval circuitry may be provided which is responsive to a data retrieval request specifying a retrieval address to retrieve a retrieved data item, an associated ECC and an associated address digest from a storage location corresponding to the retrieval address; and ECC decoding circuitry may be provided to generate a syndrome value by performing an ECC decoding operation on a decoding input value comprising data bits of the retrieved data item, code bits of the associated ECC, and address digest bits of the associated address digest, and to determine based on the syndrome value whether an error condition has occurred. The syndrome value may express whether one or more bit flip errors have occurred in the retrieved data item or the associated address digest since those values were stored to the storage, so that such errors can be corrected (if possible), or detected and flagged without correction (if correction is not possible).

Also, address digest comparison circuitry may be provided to determine whether to signal an error condition based on a comparison of: a retrieval address digest determined based on a plurality of bits of the retrieval address; and a value dependent on the associated address digest retrieved by the data retrieval circuitry. This provides protection against address decoder errors as mentioned above.

The ECC decoding circuitry may determine, based on the syndrome value, whether to correct the associated address digest retrieved by the data retrieval circuitry; and the value dependent on the associated address digest comprises the associated address digest subject to any correction based on the syndrome value. Hence, any correction of a bit flip error in a stored address digest bit based on the syndrome value from the ECC decoding operation is applied before comparing the corrected address digest with the retrieval address digest to check whether an address decoder error occurred.

The computation of the retrieval address digest is performed based on the retrieval address in a corresponding way to the computation of the address digest based on the store target address at the time of responding to request to store a received data item to the storage.

Hence, the retrieval address digest may comprise a plurality of digest indicators, each digest indicator dependent on a corresponding combination of bits of the retrieval address. Each digest indicator comprises a parity value indicative of parity of the corresponding combination of bits of the retrieval address. For a given digest indicator of the retrieval address digest, the corresponding combination of bits of the retrieval address comprises a plurality of bits of the retrieval address each decoded by a different sub-decoder circuit of the address decoding circuitry. The plurality of digest indicators of the retrieval address digest comprise at least a first digest indicator dependent on a first corresponding combination of bits at first bit positions within the retrieval address, and a second digest indicator dependent on a second corresponding combination of bits at second bit positions within the retrieval address, with the first bit positions being interleaved with the second bit positions. The bit positions of the combinations of bits used to compute each digest indicator for the retrieval address digest correspond to the bit positions of the combinations of bits used to compute the corresponding digest indicator for the address digest stored to the storage at the time of processing a store request.

As for ECC encoding, the ECC decoding circuitry may determine each bit of the syndrome value as a parity value indicative of parity of a respective combination of bits of the decoding input value.

Similar to the ECC encoding operation, for the ECC decoding operation each bit of the syndrome value generated in the ECC decoding operation depends on a different combination of bits of the decoding input value; for each data bit of the decoding input value, an odd number of bits of the syndrome value depend on that data bit; and for each address digest bit of the decoding input value, an odd number of bits of the syndrome value depend on that address digest bit. If address bits are also considered in the ECC scheme, then each address bit could influence either an odd number of bits of the syndrome value (according to a typical Hsiao matrix), or an even number of bits of the syndrome value (according to the modified approach described earlier).

The syndrome value can be used to detect bit flip errors occurring in either the stored data item or the stored address digest. The ECC decoding circuitry may be responsive to detecting that the syndrome value comprises a non-zero even number of bits set to 1, to signal a fatal error in the requested data retrieval. The ECC decoding circuitry may be responsive to detecting that the syndrome value comprises one of a plurality of single-bit-error-indicating values having an odd number of bits set to 1, to perform, based on the syndrome value, a correction operation on the retrieved data item or the associated address digest, and to output a corresponding corrected data item or corrected address digest (whether the correction is applied to the retrieved data item or the associated address digest may depend on the particular value of the syndrome value—specific values of the syndrome value may correspond to errors in specific bits of the data item or the address digest). Hence, the ECC decoding circuitry may be configured to perform the correction operation by: determining, based on the syndrome value, an erroneous bit of the retrieved data item or the associated address digest; and flipping the erroneous bit. The ECC decoding circuitry may be responsive to the syndrome value having a zero value to determine that no error condition has occurred.

Specific Examples

Specific examples are now described with reference to the drawings.

FIG. 1 schematically illustrates an example of a data processing apparatus 2 which has various instances of data storage which can be protected using ECCs. The apparatus 2 includes a number of requester devices (also known as master devices) 4, 6 which in this example include two processors, specifically central processing units (CPUs) 4, and an input/output unit 6 for controlling input or output of data from/to a peripheral device. It will be appreciated that many other types of requester devices could also be provided, such as graphics processing units (GPUs), a display controller for controlling display of data on a monitor, direct memory access controllers for controlling access to memory, etc. At least some of the requester devices may have internal data or instruction caches 8 for caching instructions or data local to the device. Other requester devices such as the input/output interface 6 may be uncached requesters. Coherency between data in the respective caches and accessed by the respective requesters may be managed by a coherent interconnect 10 which tracks requests for accesses to data from a given address and controls snooping of data in other requesters' caches when required for maintaining coherency. It will be appreciated that in other embodiments such coherency operations could be managed in software, but a benefit of providing a hardware interconnect 10 for tracking such coherency is that the programmers of the software executed by the system do not need to consider coherency.

As shown in FIG. 1, some requesters may include a memory management unit (MMU) 12 which may include at least one address translation cache for caching address translation data used for translating addresses specified by the software into physical addresses referring to specific locations in memory 14. It is also possible to provide a system memory management unit (SMMU) 16 which is not provided within a given requester device, but is provided as an additional component between a particular requester 6 and the coherent interconnect 10, for allowing simpler requester devices which are not designed with a built-in MMU to use address translation functionality. In other examples the SMMU 16 could be considered part of the interconnect 10.

As shown in FIG. 1, a data processing apparatus may have various instances of data storage for storing data items. For example, the caches 8, memory 14, as well as any translation lookaside buffers (TLB) used by the MMU 12 or SMMU 16 to cache address translation information, can all be regarded as examples of such data storage. The coherent interconnect 10 could also include various instances of storage circuitry, such as buffers for buffering memory transactions, snoop filters for tracking which addresses are cached in requester devices' caches 8, or a system cache shared between requesters 4, 6 for caching data from memory 14. It will be appreciated that there may be many other forms of data storage for storing data items. The term "data item" is a broad term intended to refer to any stored value, including not only functional data but also instructions for execution by a processor, or control state information for controlling operation of circuitry within the data processing apparatus 2.

Figure 2:
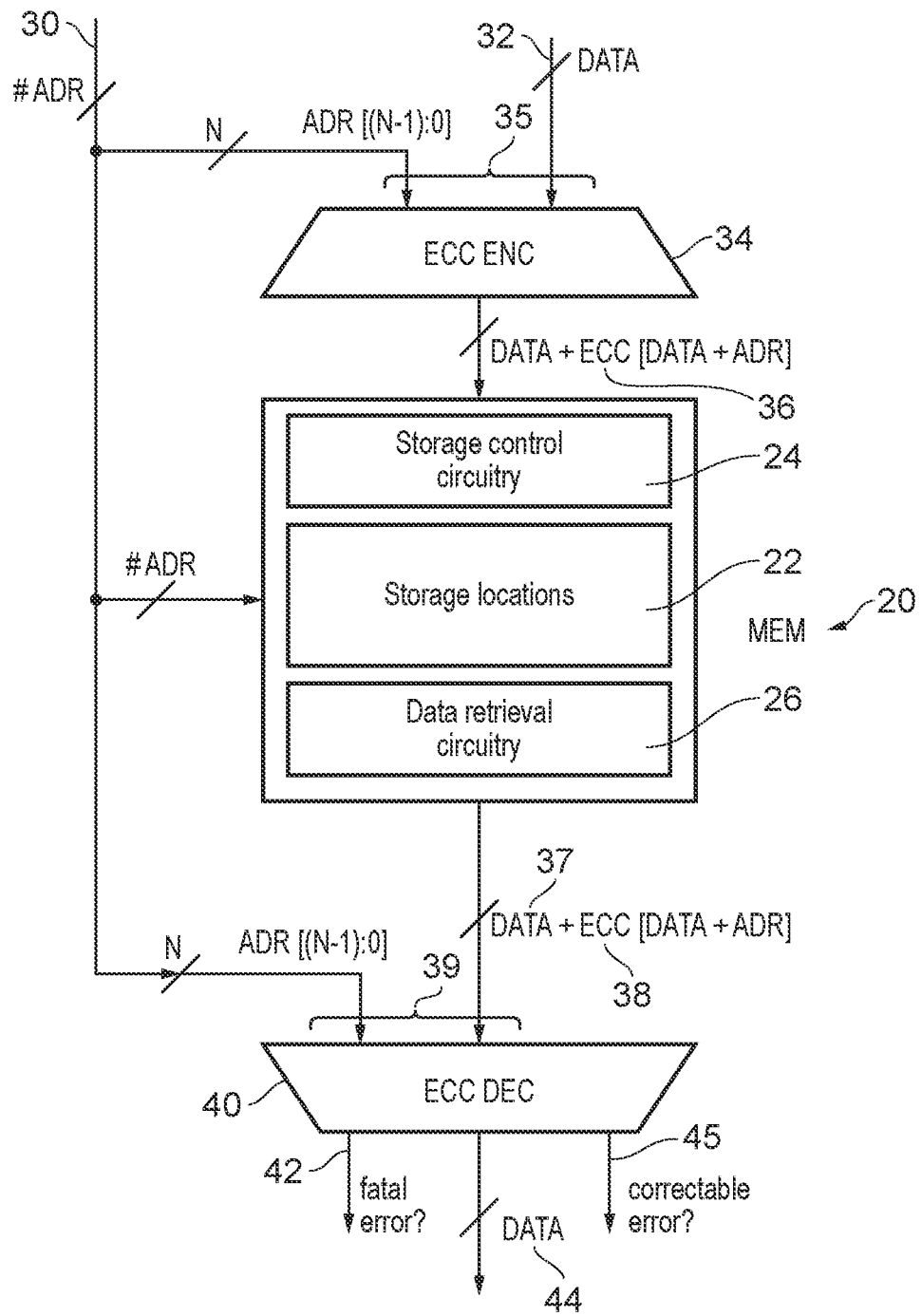
FIG. 2 illustrates an example of ECC encoding circuitry and ECC decoding circuitry associated with the storage.

FIG. 2 illustrates in more detail example of circuitry associated with a given storage unit 20 within the processing apparatus 2. For example, the storage unit 20 could be any of the examples discussed above (caches 8, memory 14, TLBs, snoop filters, buffers, etc.). The storage unit 20 comprises storage locations 22 for storing the data items themselves, along with corresponding error correction codes (ECCs). For example, the storage locations 22 may comprise memory cells implementing a given memory storage technology, such as DRAM (dynamic random access memory), SRAM (static random access memory), MRAM (magnetoresistive random access memory), PRAM (Phase change random access memory), etc. The storage locations 22 can also store other types of information, such as coherency state information used in a coherency protocol, or cache tag information used to look up whether the cache comprises a data item corresponding to a particular memory address. The storage 20 also has storage control circuitry 24 which controls storage (writing) of data and ECCs to the storage locations 22 and data retrieval circuitry 26 for controlling retrieval (reading) of data and ECCs from the storage locations 26.

An address path 30 is provided for supplying an address used to identify a storage location 22 to be read or written. Note that while for conciseness FIG. 2 shows a single address path 30 shared between read and write accesses, other examples may provide separate address paths respectively for providing a read address for a read access and a write address for a write access (e.g. the read address and write address may be provided on the separate address paths by separate read control circuitry and write control circuitry). The address used to access the storage 20 may be selected from the read address line and write address line depending on whether a read or a write access is occurring.

For some types of storage units, the address may directly identify a corresponding storage location to be read or written. For other types of storage units (e.g. caches), the storage control circuitry 24 or data retrieval circuitry 26 may indirectly identify the corresponding storage location based on the address, e.g. by performing a comparison between at least part of the address and stored cache tag information associated with one or more storage locations, to determine which storage location has the matching tag and so is the corresponding storage location to be read or written.

For write requests, a data item to be stored in the storage unit 20 is supplied on a data path 32 and the address path 30 supplies an associated address (write target address) for identifying which location is to be written with the data item. ECC encoding circuitry 34 performs an ECC encoding operation on an encoding input value 35 comprising data bits of the data item and address bits of the associated address, to generate an ECC 36. It is not essential for all the bits of the address received on the address path 32 be considered in the ECC encoding operation. In some examples, the encoding input value may comprise a proper subset of bits from the associated address, e.g. the lower N bits in the example of FIG. 2, or could comprise a decoded value with more bits than the address itself, obtained as a function of the address or a subset of bits of the address. Other examples may consider all address bits in the ECC calculation. Also, if there are some bits of the stored data item for which error protection is less critical, then it is not necessary for all the bits of the data item to be input to the ECC encoding operation as part of the encoding input value 35. The storage control circuitry 24 controls the storage unit 20 to write the data item received on data path 32 and the associated ECC 36 to the one of the storage locations 22 which corresponds to the associated address received on address path 30.

For read requests, a retrieval address is supplied on the address path 30 and the data retrieval circuitry 26 identifies the corresponding storage location and retrieves the data item 37 and ECC 38 from the storage location corresponding to the retrieval address. The retrieved data item 37 and ECC 38 should be the same as the corresponding data item and ECC 36 that were stored to that storage location in response to a previous read operation. However, it is possible that a hard or soft error could have occurred (e.g. due to cosmic background radiation, a manufacturing defect in the storage unit 20, or other temporary or permanent hardware faults), so that at least one bit of the stored data item 37 and/or ECC 38 could have changed state (flipped from 0 to 1 or vice versa). Also it is possible for a hard or soft error affecting the address path 30 or the address decoding logic in the storage control circuitry 24 or data retrieval circuitry 26 to cause the wrong storage location to be accessed to retrieve the data item 37 and ECC 38.

Hence, to protect against both data errors and address errors, ECC decoding circuitry 40 performs an ECC decoding operation on a decoding input value 39 comprising data bits from the retrieved data item 37 and address bits from the retrieval address. Similar to the encoding input value, the decoding input value 39 could comprise all data bits or only a subset of data bits of the retrieved data item, and could comprise all address bits or only a subset of address bits of the retrieved data item. In the ECC decoding operation, the ECC decoding circuitry 40 determines whether the combination of the retrieved data item 37 and ECC 38 is a valid data/ECC pair for which the ECC 38 corresponds to the data item 37, and if not either corrects the error (e.g. if the error has occurred in only a single bit of the data item 37, it can be corrected by flipping the state of that bit), or outputs a fatal error signal 42 to signal a fatal error that cannot be corrected by flipping the state of a bit of the data item 37. For example, the error signal 42 may be an interrupt signal which triggers an interrupt handling routine to execute on one of the processors 4 to determine how to handle the error. If a fatal error is signalled, then output of the output data item 44 may be blocked.

If no error has been detected or any detected error has been able to be corrected, then an output data item 44 is returned as a response to the read request. The output data item 44 can be either the retrieved data item 37 itself (in the case when no error was detected) or can be a corrected version of the retrieved data item 37, for example if a single bit data error has been corrected by flipping the state of the erroneous data bit. Optionally, if an error occurred but it was possible to fix the error and output the corrected value, a correctable error signal 45 may also be output. While the fatal error signal 42 and correctable error signal 45 are shown separately in FIG. 2, in other examples these could be represented using different encodings of a shared signal.

Hence, by folding at least some address bits of a write target address into the encoding input value 35 used to generate the ECC 36, and folding a corresponding number of address bits of a read target address into the decoding input value 39 used to decode the retrieved ECC 38 when reading from the storage 20, some protection can be provided against address bit errors which could otherwise cause the wrong storage location to be read.

Figure 3:
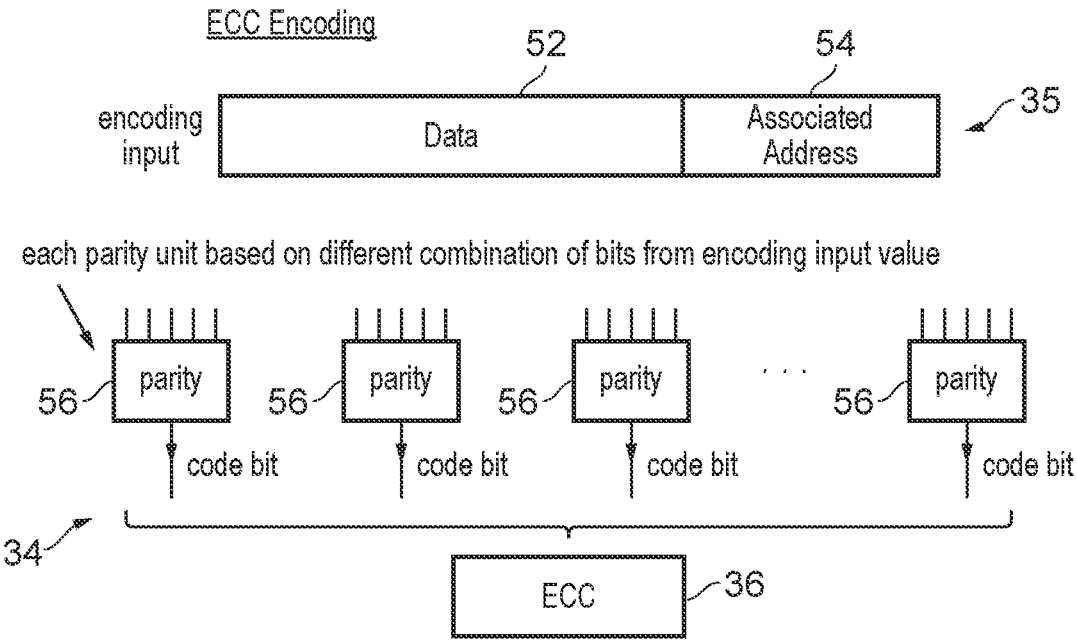
FIG. 3 illustrates an example of the ECC encoding circuitry.

FIG. 3 illustrates ECC encoding operation in more detail. As mentioned above, the encoding input value 35 includes data bits 52 from the data item intended to be stored in the storage 22 and address bits 54 from the associated address. The ECC encoding circuitry 34 includes a number of parity computing circuits 56, each parity computing circuit 56 generating one of the code bits of the ECC 36. Each parity unit 56 generates its corresponding code bit based on a different combination of bits from the encoding input value 35. The code bit is a parity value indicating the parity of the corresponding combination of bits of the encoding input value 35 used for that code bit. The parity could be computed according to various parity determination functions, e.g. odd parity or even parity. For odd parity, within a symbol comprising the parity bit itself and the combination of bits used to compute the parity bit, the number of bits set to 1 in the symbol is an odd number (i.e. an odd parity bit takes the value (0 or 1) needed to make the overall symbol have an odd number of bits set to 1). For even parity, the number of bits set to 1 in the symbol is an even number (i.e. an even parity bit has the value needed to make the overall symbol have an even number). For example, a parity computing circuit 56 which computes the code bit according to odd parity may combine its respective bits selected from the encoding input value 35 using an exclusive NOR (XNOR) operation, while a parity computing circuit 56 which computes the code bit according to even parity may combine its respective bits selected from the encoding input value 35 using an exclusive OR (XOR) operation.

Figure 4:
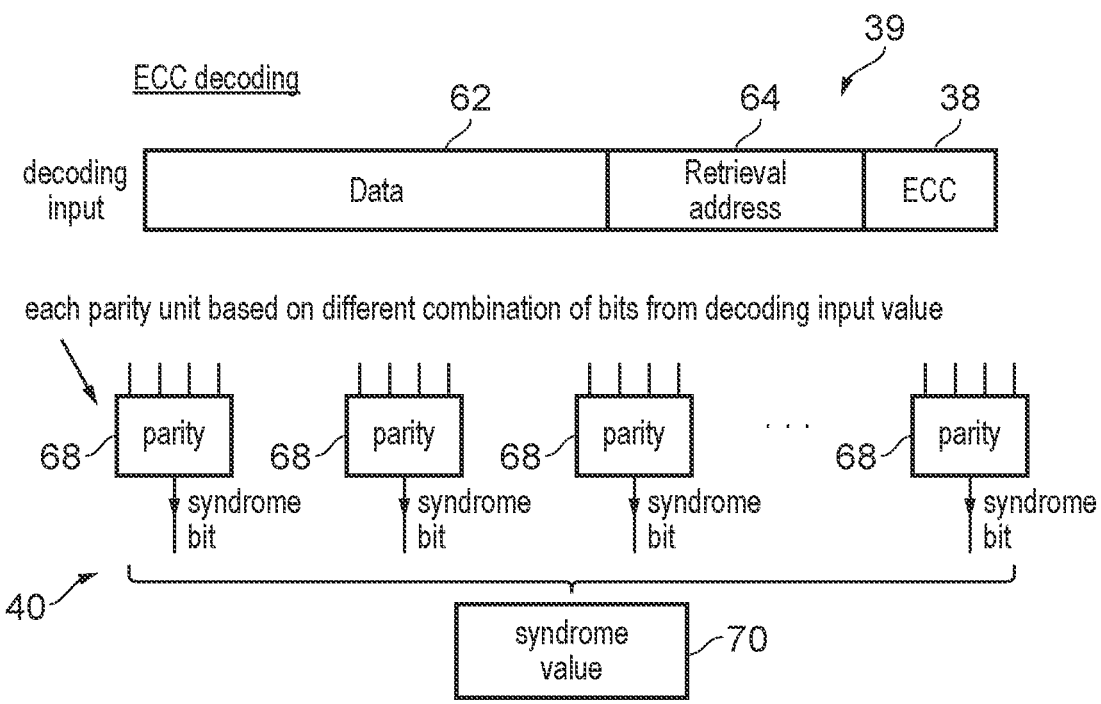
FIG. 4 illustrates an example of the ECC decoding circuitry.

FIG. 4 illustrates the ECC decoding operation in more detail. The decoding input value 39 includes data bits 62 from the retrieved data item read from the storage 22 (the data bits 62 could comprise all bits of the data item 37 or could be a subset of bits of the data item 37), the associated ECC 38 which is read from storage 22 along with the data item, and the address bits 64 from the retrieval address which is used to select the storage location from which the retrieved data item was read. In a similar way to the ECC encoding circuitry 34, the ECC decoding circuitry 40 includes a number of parity computing circuits 68 which each generate a respective syndrome bit of a syndrome value 70. Again, each parity unit 68 generates its corresponding syndrome bit based on a different combination of bits from the decoding input value 39. Each syndrome bit is computed by applying a parity checking function to a corresponding combination of bits of the decoding input value 39 associated with the corresponding code bit of the ECC. If an odd parity determination function (e.g. XNOR) was used to encode a given code bit of the ECC, a corresponding odd parity checking function (based on XNOR) is used to perform the check that generates the corresponding syndrome bit. If an even parity determination function (e.g. XOR) was used to generate a given code bit of the ECC, a corresponding even parity checking function (based on XNOR) is used to perform the check that generates the corresponding syndrome bit. Alternatively, it would be possible to have mismatched parity determination/checking functions (e.g. a code bit generated by odd parity but checked using even parity), but that would change the rules for determining which syndrome values represent errors—it can be more straightforward if the parity determination/checking functions correspond as this makes it more straightforward to interpret the syndrome value (e.g. with an all 0 syndrome value indicating no error).

As discussed in more detail below, the syndrome value 70 can be used by the ECC decoding circuitry 40 to identify whether either no error condition has occurred, a single bit data error has occurred which can be correctable by flipping the state of one bit of the retrieved data item 37, or a fatal error has occurred (e.g. due to an address error or a multi-bit data error) for which the correction to be made cannot be identified.

The specific combinations of bits used by the parity computing circuits 56, 68 to generate each code bit or syndrome bit in the ECC encoding/decoding operations can be represented logically using a matrix. The matrix which represents the combinations of bits used to generate each code bit in the ECC encoding operation can be referred to as a generator matrix G and the matrix which represents the combinations of bits used to generate each syndrome bit in the ECC decoding operation can be referred to as a parity check matrix H. Note that it is not necessary to store a numeric representation of the contents of the generator matrix G and the parity check matrix H. Rather, the properties of the generator matrix G and parity check matrix H can be represented in the circuit hardware in terms of the specific interconnections between signal lines conveying each bit of the encoding/decoding input value 35, 38 and the parity computing units 56, 68 used to generate each code/syndrome bit of the ECC 36 or syndrome value 70. Nevertheless, the matrix representation can be a convenient way of concisely representing the particular interconnections provided in the hardware.

In a typical description of an ECC scheme not supporting address folding (so the encoding input value would include the data bits 52 only, not the address bits 54), the data may be represented as a column vector p, and the codeword (data 52 and ECC 36) stored to the storage location is the product of a generation matrix, G with this:

$$Gp = x$$

Then the decode operation uses a similar matrix H to generate a syndrome (which is zero in the no-error case):

$$Hx = 0$$

For example, the ECC comprising code bits c0, c1, c2 in this example can be generated using the following matrix multiplication (where the 7×4 matrix on the left is the generator matrix G):

$$\begin{bmatrix} 1 & 0 & 0 & 0 \\ 0 & 1 & 0 & 0 \\ 0 & 0 & 1 & 0 \\ 0 & 0 & 0 & 1 \\ m3 & m2 & m1 & m0 \\ m7 & m6 & m5 & m4 \\ m11 & m10 & m9 & m8 \end{bmatrix} \begin{bmatrix} d3 \\ d2 \\ d1 \\ d0 \end{bmatrix} = \begin{bmatrix} d3 \\ d2 \\ d1 \\ d0 \\ m3d3 + m2d2 + m1d1 + m0d0 \\ m7d3 + m6d2 + m5d1 + m4d0 \\ m11d3 + m10d2 + m9d1 + m8d0 \end{bmatrix} = \begin{bmatrix} d3 \\ d2 \\ d1 \\ d0 \\ c2 \\ c1 \\ c0 \end{bmatrix}$$

The G matrix contains an identity matrix (in the example below, the top 4 rows comprising the diagonal arrangement of 1s) such that the resulting codeword includes the data bits as well as the code bits. However, when designing the ECC encoding circuitry 34 we can generally ignore this part because no circuitry is required—the data bits 52 map unchanged from the input to the output of the ECC encoding operation, and the original data value is simply stored to the storage circuitry in its original form. Therefore, the ECC encoding circuitry may only calculate the code bits (e.g. c0, c1, c2) by evaluating the product of the corresponding rows of the generator matrix G (the bottom 3 rows in the example below) with the data vector. In addition, the rows can appear in a different order, such that the identity part of the matrix is not apparent. Also, while this appears to require a series of multiplications and additions, if each matrix element m0 to m11 is either 1 or 0, the matrix multiplication can be evaluated using modulo-2 arithmetic, which is equivalent to each code bit c0, c1, c2 corresponding to a parity value computed (with odd parity) from the relevant data bits d0-d3 that correspond to 1s in the generator matrix G. Hence, the parity computing units 56 described in FIG. 3 can be used to generate each code bit, and the ECC generation function may be implemented as (with ⊕ representing the XOR operator—although as noted below, it is possible for some code bits to be calculated using XNOR instead):

$$\begin{bmatrix} 1 & 0 & 0 & 0 \\ 0 & 1 & 0 & 0 \\ 0 & 0 & 1 & 0 \\ 0 & 0 & 0 & 1 \\ m3 & m2 & m1 & m0 \\ m7 & m6 & m5 & m4 \\ m11 & m10 & m9 & m8 \end{bmatrix} \begin{bmatrix} d3 \\ d2 \\ d1 \\ d0 \end{bmatrix} = \begin{bmatrix} d3 \\ d2 \\ d1 \\ d0 \\ m3d3 \oplus m2d2 \oplus m1d1 \oplus m0d0 \\ m7d3 \oplus m6d2 \oplus m5d1 \oplus m4d0 \\ m11d3 \oplus m10d2 \oplus m9d1 \oplus m8d0 \end{bmatrix} = \begin{bmatrix} d3 \\ d2 \\ d1 \\ d0 \\ c2 \\ c1 \\ c0 \end{bmatrix}$$

For decoding, a similar matrix multiplication can be used to generate the syndrome bits (e.g. s0, s1, s2 in the simplified example shown here) based on the data bits d0, d1, d2, d3 and code bits c0, c1, c2, where the 3×7 matrix shown on the left is the parity check matrix H:

$$\begin{bmatrix} m3 & m2 & m1 & m0 & 1 & 0 & 0 \\ m7 & m6 & m5 & m4 & 0 & 1 & 0 \\ m11 & m10 & m9 & m8 & 0 & 0 & 1 \end{bmatrix} \begin{bmatrix} d3 \\ d2 \\ d1 \\ d0 \\ c2 \\ c1 \\ c0 \end{bmatrix} = \begin{bmatrix} s2 \\ s1 \\ s0 \end{bmatrix}$$

Again, this can be implemented using modulo-2 arithmetic so that each syndrome bit s0, s1, s2 is a parity value for the combination of data/code bits d0-d3, c0-c2 that correspond to is in the corresponding row of the parity check matrix H, and so this matrix multiplication does not require more complex circuitry to carry out multiplications and additions.

When it comes to adding address folding, the G and H matrices are wider (q bits) to factor in the address bits. The ECC encoding operation takes as inputs the data bits 52 (d0-d3) and address bits 54 (a0-a2) and produces the corresponding code word to be stored to the storage including data bits (d0-d3) and code bits (c0-c2):

$$\begin{bmatrix} 0 & 0 & 0 & 1 & 0 & 0 & 0 \\ 0 & 0 & 0 & 0 & 1 & 0 & 0 \\ 0 & 0 & 0 & 0 & 0 & 1 & 0 \\ 0 & 0 & 0 & 0 & 0 & 0 & 1 \\ q2 & q1 & q0 & m3 & m2 & m1 & m0 \\ q5 & q4 & q3 & m7 & m6 & m5 & m4 \\ q8 & q7 & q6 & m11 & m10 & m9 & m8 \end{bmatrix} \begin{bmatrix} a2 \\ a1 \\ a0 \\ d3 \\ d2 \\ d1 \\ d0 \end{bmatrix} = \begin{bmatrix} d3 \\ d2 \\ d1 \\ d0 \\ c2 \\ c1 \\ c0 \end{bmatrix}$$

Again, the rows of the matrix which contain only one 1, which correspond to the data bits in the code word, are not actually computed by the circuitry as the data bits are mapped through unchanged. According to a modulo-2 arithmetic implementation of the matrix multiplication, the parity computing circuits 56 compute each code bit c0-c2 based on the parity of the combination of data/address bits which correspond to is in the corresponding row of the generator matrix G.

Similarly, for the ECC decoding operation, the parity check matrix H has a corresponding form based on the same combination of matrix coefficients m0-m11 and q0-q8 as defined in the generator matrix G, to control which combinations of data/code/address bits of the decoding input value 39 are combined to form each syndrome bit s0-s2.

$$\begin{bmatrix} q2 & q1 & q0 & m3 & m2 & m1 & m0 & 1 & 0 & 0 \\ q5 & q4 & q3 & m7 & m6 & m5 & m4 & 0 & 1 & 0 \\ q8 & q7 & q6 & m11 & m10 & m9 & m8 & 0 & 0 & 1 \end{bmatrix} \begin{bmatrix} a2 \\ a1 \\ a0 \\ d3 \\ d2 \\ d1 \\ d0 \\ c2 \\ c1 \\ c0 \end{bmatrix} = \begin{bmatrix} s2 \\ s1 \\ s0 \end{bmatrix}$$

Figures 5, 6:
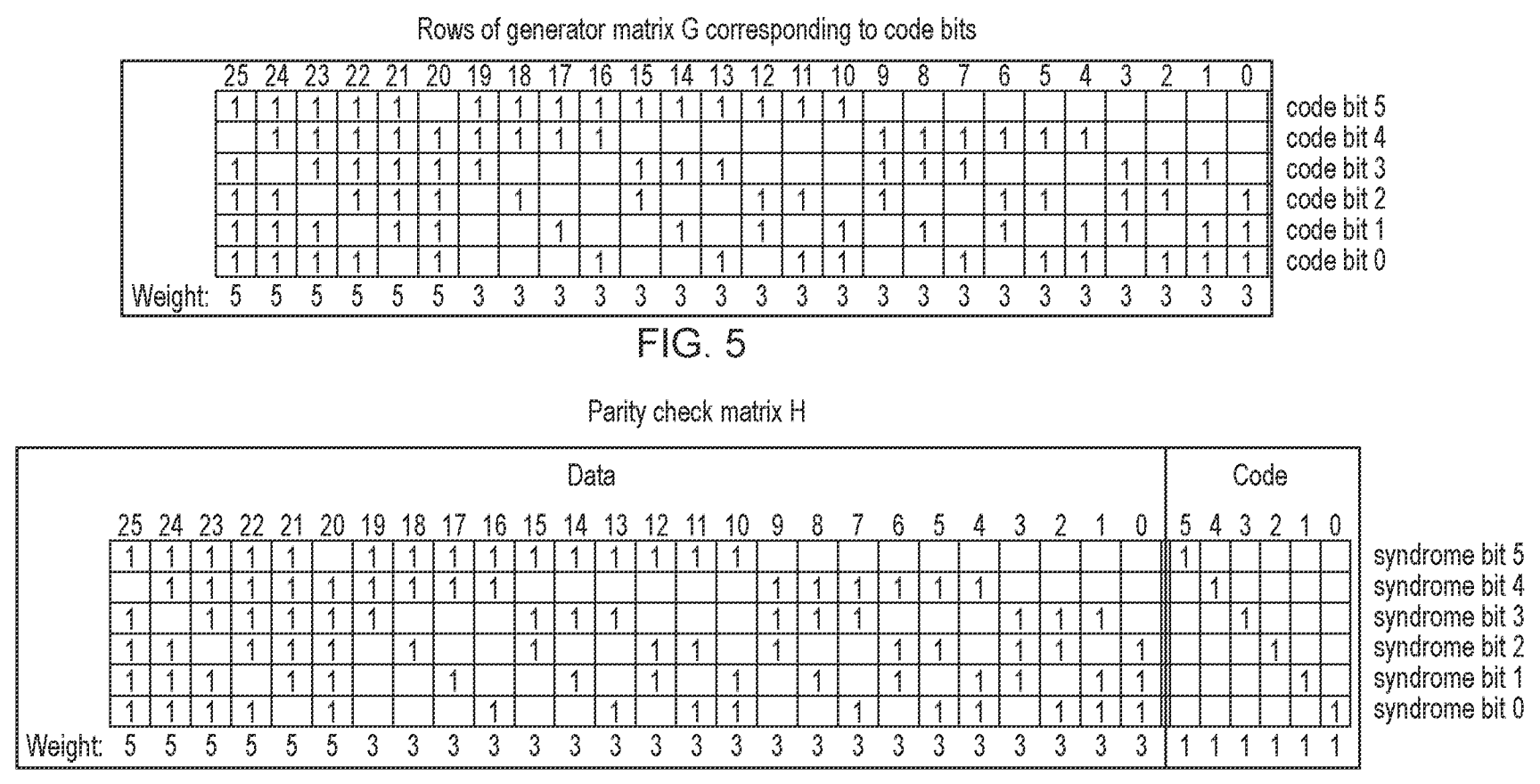

FIG. 5 illustrates an example of a generator matrix G, known as a Hsiao matrix, as used in an example which does not support address folding (so only applies the ECC determination to data bits, not address bits). It is noted that the specific pattern of is in the matrix is not necessarily known, but FIG. 5 illustrates a principle used to construct such matrices. This example shows an ECC scheme which protects 26 bits of data using 6 code bits. The rows of the generator matrix G which correspond to data bits in the matrix equations above (which only contain a single 1 and so are not actually implemented by the ECC encoding circuitry as they map the data through unchanged) are omitted in FIG. 5.

Hence, each row shown in FIG. 5 corresponds to one of the code bits and each column corresponds to one of the data bits in the encoding input value. For each row of the matrix, the elements marked "1" indicate the data bits which are combined to generate the corresponding code bit. For example, code bit 5 in this example is generated by combining data bits 10, 11, 12, 13, 14, 15, 16, 17, 18, 19, 21, 22, 23, 24 and 25 in a parity computation. Code bit 0 indicates whether the number of is in that combination of data bits is odd or even. For each column of the matrix, the is indicate which code bits are dependent on the corresponding data bit. For example, the column in FIG. 5 corresponding to data bit 19 indicates that code bits 3, 4 and 5 are dependent on data bit 19, but code bits 0, 1 and 2 do not depend on data bit 19 as the parity computations for code bits 3, 4 and 5 do not use data bit 19. For a typical Hsiao scheme, the parity computations are based on even parity using XOR combinations of bits.

FIG. 6 shows the parity check matrix H which corresponds to the generator matrix G of FIG. 5. The parity check matrix H comprises columns corresponding to the data bits 62 of the retrieved data item (the columns corresponding to data bits having the same matrix pattern as in the generator matrix G) as well as some additional columns corresponding to the code bits of the ECC 38 retrieved with the data item, which comprise a diagonal sequence of 1s. Each row of the parity check matrix H indicates which data bits and code bits are combined in the parity computation to generate the corresponding syndrome bit. Each column indicates which syndrome bits are influenced by each data/code bit.

Effectively, the parity check matrix H represents the same combinations of data bits as in FIG. 5, but with an additional parity combination of the result of those parity combinations with the corresponding code bit, and so if the retrieved data item and ECC are the same as the stored data item and ECC that were written to the storage previously, the syndrome value will be 0 to indicate no error.

In the case of a 1-bit error in either the data or the ECC, the syndrome bits will become 1 in all the places that the erroneous data/ECC bit is factored in to, and so the syndrome value 70 will equal the value of the appropriate column in the matrix. For example, if there is a 1-bit error in data bit 7, the syndrome value [s5:s0] will become 0b011001 which corresponds to the matrix column value corresponding to data bit 7. This column value therefore tells you which bit was in error. It follows that all the columns should have unique values so that all 1-bit errors can be uniquely identified.

If a 2-bit error occurs, then the syndrome will be the XOR of the two appropriate columns. In order for 2-bit errors to be distinguishable from 1-bit errors none of the possible two-column combinations can have any of the column (i.e. 1-bit error) values. A Hsiao code achieves this by using column values which all have an odd weight (i.e. an odd number of 1s). For example, in FIG. 5 all the columns corresponding to data bits have either 3 bits set to 1 or 5 bits set to 1. Because the XOR of two different odd-weighted values has an even weight, all the possible 2-bit error syndromes have an even weight and therefore do not overlap with the 1-bit error syndromes (i.e. the column values). For example, in FIG. 6 if the errors are in data bits 0 and 1, the XOR of column value 0b000111 corresponding to data bit 0 and column value 0b001011 corresponding to data bit 1 gives 0b001100 which is an even-weighted syndrome value with 2 bits set to 1, and so does not correspond to any of the odd-weighted 1-bit error syndromes.

One might assume that, for implementations using address folding, the address bits 54, 64 included in the encoding/decoding input values 35, 39 for the ECC encoding/decoding operations should simply be treated as additional data bits. For example, with the generator matrix G and parity check matrix H shown in FIGS. 5 and 6, a certain number of the odd-weighted column values (e.g. columns 0 to 7) could be assigned to address bits, and the remaining columns can be used for the data bits.

Figures 7, 8:
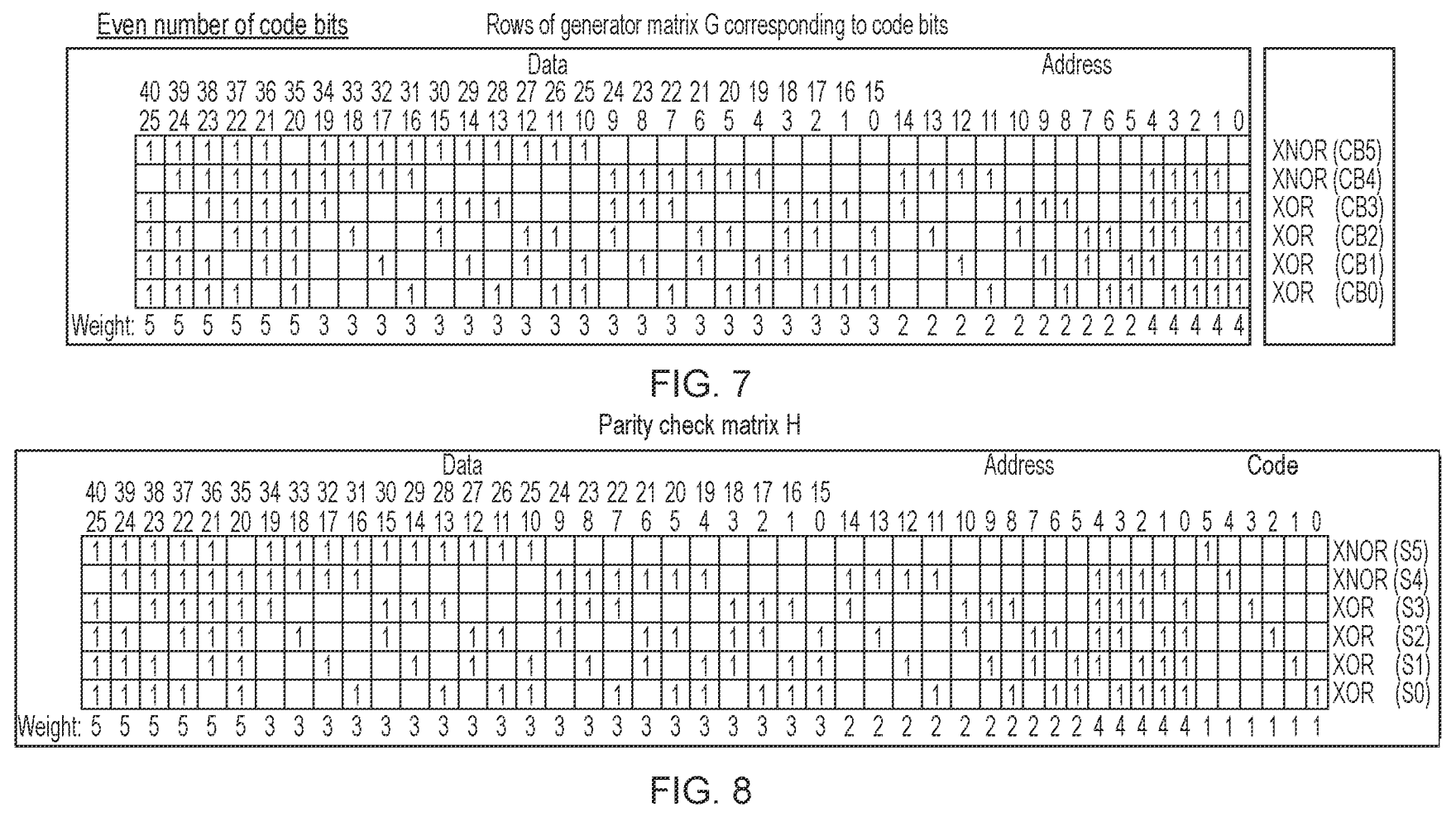

However, FIGS. 7 and 8 show a modified Hsiao scheme in which in which the columns used for data have an odd weight, while the columns used for address bits have an even weight. Hence, when implementing the modified matrices, the ECC encoding circuitry will use each data bit in the computation of an odd number of code bits, and use each address bit in the computation of an even number of code bits. In a corresponding way, the ECC decoding circuitry uses each data bit in the computation of an odd number of syndrome bits, but uses each address bit in the computation of an even number of code bits. This is counter-intuitive as it departs from the Hsiao principle that each bit being used to generate the ECC should have an odd-weighted matrix column.

However, the observation made is that in a typical RAM a single fault may impact either the data value read, or the location which data is read from (an addressing fault) but not both, since the address decoding logic is typically physically separated from the data storage cells and so the probability of a simultaneous event affecting both data storage and address decoding is negligibly low. Therefore, if a 1-bit address fault occurs the syndrome will have an even weight, which is naturally interpreted as being a fatal error (i.e. no special decode is required, since even weights are already treated as fatal errors to handle double-bit data errors). Because the XOR of two even-weighted values has an even weight, all possible multi-address-bit error syndromes will have an even weight and therefore be detectable—except the relatively uncommon case where the columns have all cancelled out to produce a zero syndrome.

In contrast, if a matrix constructed according to standard Hsaio matrix principles as shown in FIGS. 5 and 6 is used with all columns (including address bits) being odd-weighted, a multi-address-bit error combines multiple odd-weighted columns, which may result in an even-weighted syndrome (which is detectable) or an odd-weighted syndrome. If the odd-weighted syndrome corresponds to a data column value then the syndrome will be interpreted as a 1-bit data error and the scheme will attempt to correct the error by flipping the appropriate data bit. This just serves to corrupt the already incorrect data and is effectively an undetected error.

To take an example, for a scheme with 64-bits of data, an 8-bit ECC code stored in a 72×1024 RAM—i.e. using 10 address bits. There are 256 possible syndromes. Using a standard Hsaio matrix, a multi-address-bit error can result in any syndrome value. 64 of these are interpreted as 1-bit data errors, 8 as 1-bit code errors, and 1 as no-error, while the remaining are interpreted as either 1-bit address errors or multi-bit data errors. The total detected are 1−((64+8+1)/256)=72%. Using the modified approach shown in FIGS. 7 and 8 with even-weighted columns corresponding to address bits, a multi-address-bit error can result in any even-weighted syndrome value of which there are 256/2=128. One of these is interpreted as no-error, while the remaining are interpreted as either 1-bit address errors or multi-bit data errors. The total detected are 1−(1/128)=99%. Hence, the detection rate for multi-address-bit errors is higher with the approach shown in FIGS. 7 and 8, while multi-data-bit error detections are unaffected.

In addition, the number of odd-weighted column values available for data is higher with the approach shown in FIGS. 7 and 8 because no such columns are consumed by address bits. For a given number of code bits, there are a limited number of odd-weighted column values available, which will tend to limit the maximum number of data bits that can be protected using an ECC with that number of code bits. Increasing the code size to support additional code bits would require additional circuit logic and one or more additional storage cells in each storage location 22, which would be undesirable. Hence, using up odd-weighted column values for address bits would reduce the maximum number of data bits that can be protected using an ECC of a given size. In contrast, with the approach shown in FIGS. 7 and 8 address bits can be folded into the ECC encoding/decoding without any reduction on the number of data bits that can be protected with a given size of ECC. For example, FIGS. 7 and 8 show an approach which uses a 6-bit ECC code to protect 26 bits of data and 15-bits of address.

It will be appreciated that other examples could use a different size codeword, and that the specific patterns of is and 0s could vary. For example, a different allocation of odd/even weighted columns to the data/address bits respectively could be used.

A common type of fault in data storage circuitry is a stuck-at-0 or stuck-at-1 fault, which causes the storage cell to permanently output either 0 or 1 regardless of whether the bit input to that cell when the cell is written was 0 or 1. This can be caused by faults which impact the control circuitry for all the bits, e.g. when no word-lines are selected for a read of a RAM with 1 read port and 1 write port). Although it would be possible to use an ECC scheme which treats an all-0 or all-1 data/ECC pair as a valid codeword with no error, and use a separate check of the word lines or other control logic to determine whether the all-0 or all-1 value has been caused by a control error, a more efficient approach can be to design the ECC scheme so that, in the ECC encoding operation, all-0 values of the data bits 52 do not cause the corresponding ECC 36 to be generated with all bits set to 0, and all-1 values of the data bits 52 do not cause the corresponding ECC 36 to be generated with all bits set to 1. Also, in the decoding operation, the syndrome value calculation is such that if the data/ECC bits are all 0 or all 1, the syndrome value 70 has a non-zero value so that an error is detected. This avoids the need for separate stuck-at-0 or stuck-at-1 detection circuitry, as the stuck-at-0 or stuck-at-1 faults affecting an entire storage location can be detected using the same ECC scheme that is also used to protect against single-bit or multi-bit errors.

To support the stuck-at-0 or stuck-at-1 detection using the ECC scheme, it can be useful to construct the generator matrix G and corresponding parity check matrix H according to a set of rules, which vary depending on whether the ECC has an even number of bits or an odd number of bits.

FIGS. 7 and 8 show examples of the matrices G, H for an even codeword size. In this case, the matrices have the following properties:

Address matrix is constructed using even-weight non-identical columns and no column having null weight. Hence, each address bit influences the computation of an even number of code bits (in ECC encoding) or syndrome bits (in ECC decoding).

Data Matrix is constructed using odd-weight non-identical columns codes (e.g. columns with 3 bits set to 1, 5 bits set to 1, etc.). Hence, each data bit influences the computation of an odd number of code bits (in ECC encoding) or syndrome bits (in ECC decoding).

For at least one of the code/syndrome bits, none of the address bits contribute to the calculation of that code/ syndrome bit. See the empty row in the address matrix corresponding to code bit 5/syndrome bit 5 in FIGS. 7 and 8, which indicates that code bit 5 and syndrome bit 5 depend on a combination of data bits but do not depend on any of the address bits. Further this specified check bit calculation which is independent of the address bits is constrained to be the opposite parity from most of the other code bit/syndrome bit parity calculations. For example, if most of the code bit/syndrome bit calculations are based on odd parity, the bit calculated independent of the address bit is calculated using even parity, or vice versa. In this example, XNOR logic calculates code bit 5/syndrome bit 5 based on a combination of data bits (and for the ECC decoding, based on code bit 5), according to odd parity. The majority of other code/syndrome bits are calculated based on XOR logic based on even parity.

Further, then amongst the other check bits (CB0-to-CB4 or S0-to-S4) in the example of FIGS. 7 and 8) one of the other check bit is additionally constrained to opposite parity compared to the others. In FIGS. 7 and 8, for example, the code bit CB4 and syndrome bit S4 is calculated using XNOR logic using odd parity, the opposite to the even parity used for the XOR logic for CB0-CB3 and S0-S3.

It will be appreciated that the specific combination of column values and XNOR/XOR pattern shown in FIGS. 7 and 8 is just one example of a generator matrix G and parity check matrix H following these construction rules, and other matrix patterns can be determined which follow the same rules.

Figures 9, 10, 11:
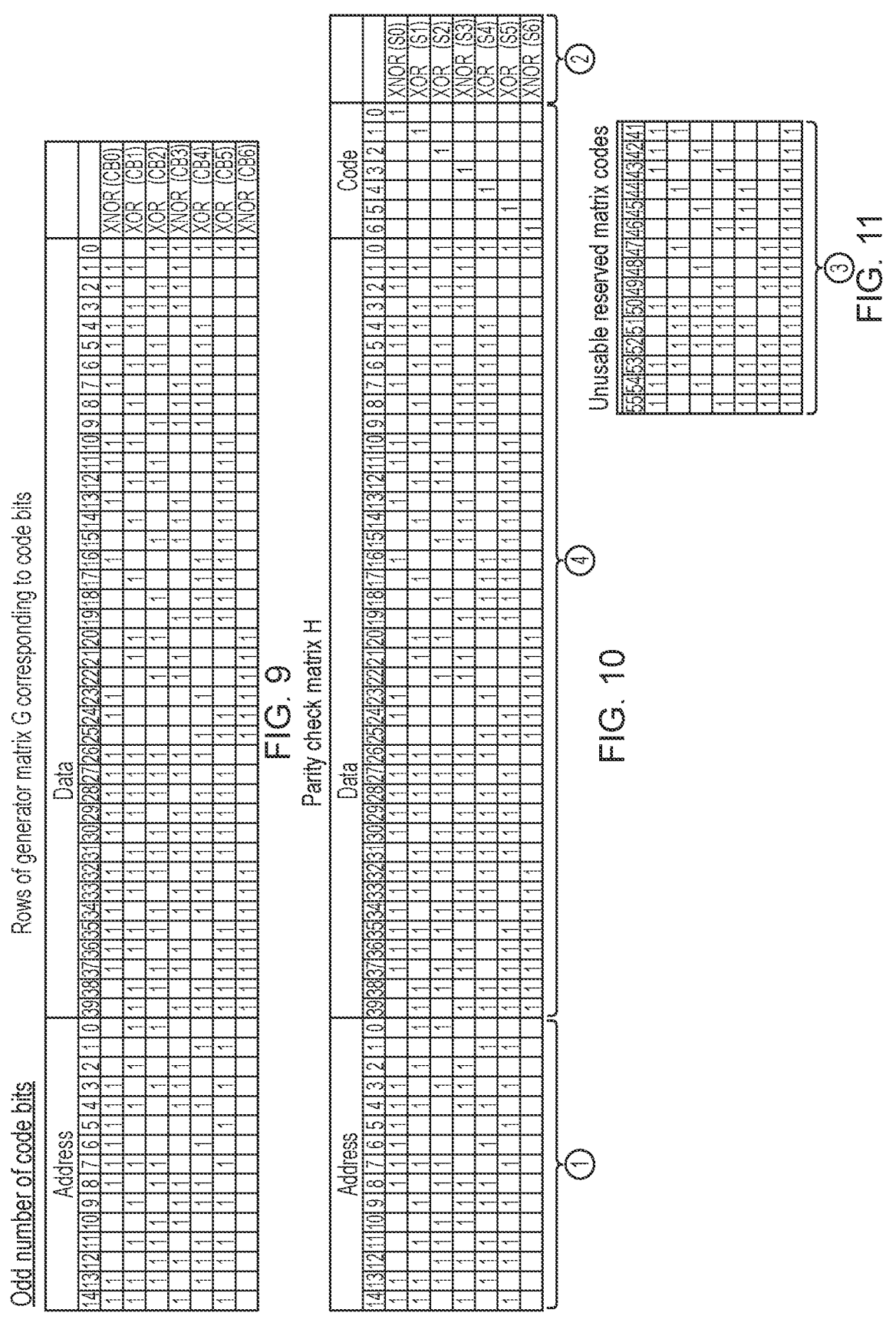

FIGS. 9 and 10 show another example of the generator matrix G and parity check matrix H for an example having an odd codeword size (where the codeword has an odd number of bits, e.g. 7 bits in this example). In this case, there are some additional rules so that the ECC computations will not treat data/ECC pairs with all bits set to 0 or all bits set to 1 as a valid non-error encoding:

Address Matrix Properties (See Part 1 of FIG. 10):
  Comprises even weight columns (each address bit influences an even number of code bits/syndrome bits).
  Comprises an empty row wherein the address does not contribute towards the calculation of the respective error code check bit (along with Data Matrix being constrained to contribute with odd weight in the same row).
  The column codes chosen to construct the address matrix form a closed group under the XOR operation. This ensures that any arbitrary combination of the input address would effectively be representable by one of the address matrix codes within the group (exception being ALL-0 code). For example XOR(A[0],A[3])=A[14] in the example of FIGS. 9 and 10.

XOR (Even Parity)/XNOR (Odd Parity) Combination (See Part 2 of FIG. 10):
  The code/syndrome bit corresponding to the row wherein address does not contribute for the calculation is constrained to be opposite parity to the other regular error check bits. In the example shown above it is CB6 which is constrained to be determined from XNOR logic (rather than regular XOR logic).
  For the remaining of code/syndrome bits:
    An even number (2, 4, 6 . . . etc) of the code/syndrome bits are constrained to have the opposite parity to the regular convention.
    Further, the combination of odd/even parity (XNOR/XOR) is decided such that it does not match any of the in-use address-matrix column codes forming the closed group as described for the address matrix above (if fewer address bits are required than the maximum protectable using the ECC scheme, the combination of odd/even parity could still correspond to one of the closed set of address matrix column codes that is not in use for protecting any of the address bits folded into the ECC).
  In the example shown in FIGS. 9 and 10, it can be seen that the XNOR/XOR combination for the remaining code/syndrome bits other than the bit where the address does not contribute corresponds to 0b001001 (with 1s indicating XNOR and 0s indicating XOR) and there exists no column value in the address-matrix which has value of 1 only in the rows corresponding to CB0/S0 & CB3/S0, hence CB0/S0 & CB3/S3 are also determined through odd parity/XNOR logic instead of even parity/XOR logic.

It will be appreciated that it would be possible to flip the XNOR/XOR designations for all code/syndrome bits while still meeting these constraints, and that a different combination of the specific code/syndrome bits assigned the opposite parity convention to the other bits could be used.

Unusable Reserved Matrix-Codes (See FIGS. 11 and 12):
  Amongst all available odd-weight matrix column code combinations, a selected few are categorized (or reserved) as unusable data matrix codes (column values). Given this condition, an ECC output syndrome matching any of these reserved codes would effectively result into the generation of a fatal error flag.
  The selection/determination of these codes is dependent on the address matrix codes & even/odd parity combination used for error code check bits calculations (while being independent of data matrix design since the code reservation is intended to provide ALL-0 detection, wherein Data matrix design does not have any influence on the output syndrome).
  Typically, the number of codes to be reserved with the scheme described herein would be limited to the size of the closed group being used for the address-matrix, thereby limiting the code unusable penalty for the data matrix.

Figure 12:
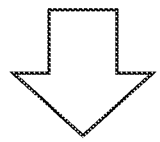

FIG. 12 illustrates a method to determine the data matrix column codes which are to be reserved (or blocked for usage). For each address matrix column code, the corresponding data matrix column code to be reserved is the XOR of that address matrix column code with an odd/even parity code indicating the pattern of XNOR/XOR logic applied for each code/syndrome bit in the ECC encoding/decoding operation.

As an example, it can be seen that, performing row-wise XOR operation for column A[14](0101011]) & odd/even parity code ([1001001]) results into a code ([1100010] having decimal value of 98) that needs to be blocked for the use in data matrix. Similarly, by performing same row-wise XOR operation on all the available address column codes with odd/even parity code results into complete list of codes that needs to be reserved (or blocked from use).

Further, depending on the choice of address column codes and given certain input address combination, there may exist a case wherein the effective row-wise contribution of addresses is ALL-0 (i.e. [0000000]). Specifically if this is the case then one more extra code is reserved which is obtained through row-wise XOR operation of ALL-0s with the odd/even parity code. In the example shown on the left, under the input condition of A[14:12]=1 & A[11:0]=0 the resultant address code contribution to the check bits is ALL-0s (since row-wise XOR(A[14], A[13], A[12])=[0000000], and other address bits do not contribute), and so an extra code to be reserved for the corresponding condition and is provided in the last column of the matrix (left-bottom) having a decimal value of 73.

Data Matrix-Code Properties (See Part 4 of FIG. 10):
  The data matrix is constructed using odd-weight non-identical columns codes (e.g. 3 bits set to 1, 5 bits set to 1, etc.). In the example shown in FIGS. 9 and 10, it can be seen that the data matrix consists of codes having only either 3-1's or 5-1's in any given column.
  The data matrix should not include any of the reserved column codes as identified above (see FIGS. 11 and 12).
  The data matrix is constructed (or arranged) in a way so that an odd weight contribution is achieved for the row wherein the address does not contribute towards the calculation of the respective error code check bit. In the example shown above it can be seen that the row corresponding to CB6/S6 has no contribution coming from address bits (i.e. no 1's in this row of the address matrix) whereas data contribution is an odd weight (15 bits set to 1 in the respective row of the data matrix for data bits).
  The total number of data bits considered for the scheme should be an even number, such that the codeword size is an odd number.

Again, it will be appreciated that the specific matrices shown in FIGS. 9 and 10 are just one example, and other matrix patterns can be determined which follow the same rules.

Methods

Figure 13:
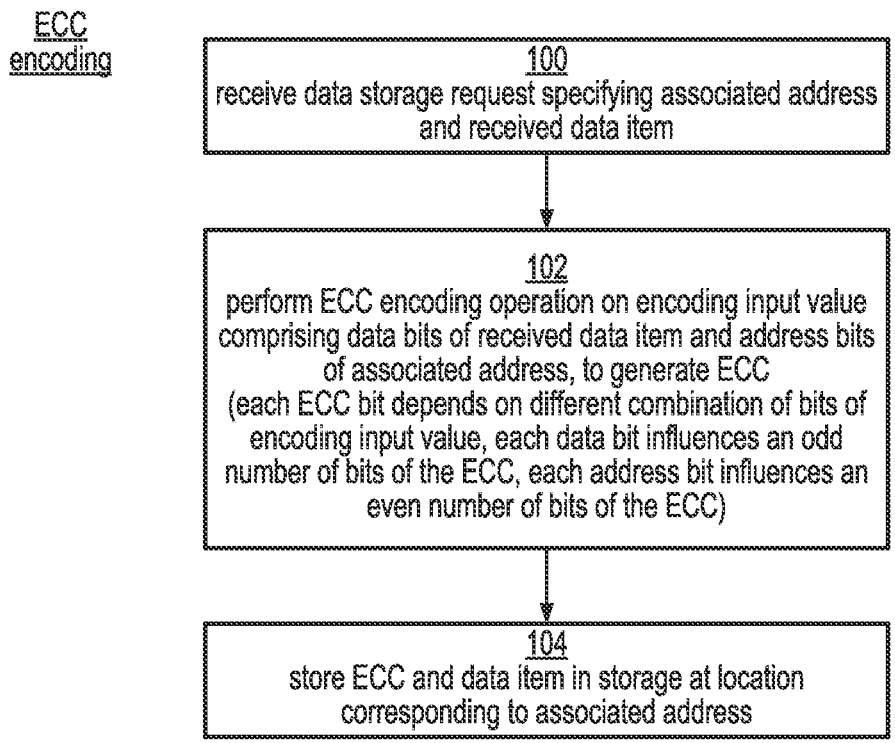
FIG. 13 illustrates a method of ECC encoding.

FIG. 13 illustrates a method of performing an ECC encoding operation using the ECC encoding circuitry 34. At step 100, a data storage request is received specifying an associated address and received data item to be stored in the storage 22. In response to the data storage request, at step 102 the ECC encoding circuitry 34 performs an ECC encoding operation on an encoding input value 35 comprising data bits 52 of the received data item and address bits 54 of the associated address, to generate an ECC 36. Each ECC bit depends on a different combination of bits of the encoding input value 35, with each data bit 52 influencing an odd number of bits of the ECC and each address bit 54 influencing an even number of bits of the ECC. At step 104, the storage control circuitry 24 controls storage of the ECC 36 and the received data item to the location of storage 22 corresponding to the associated address.

Figure 14:
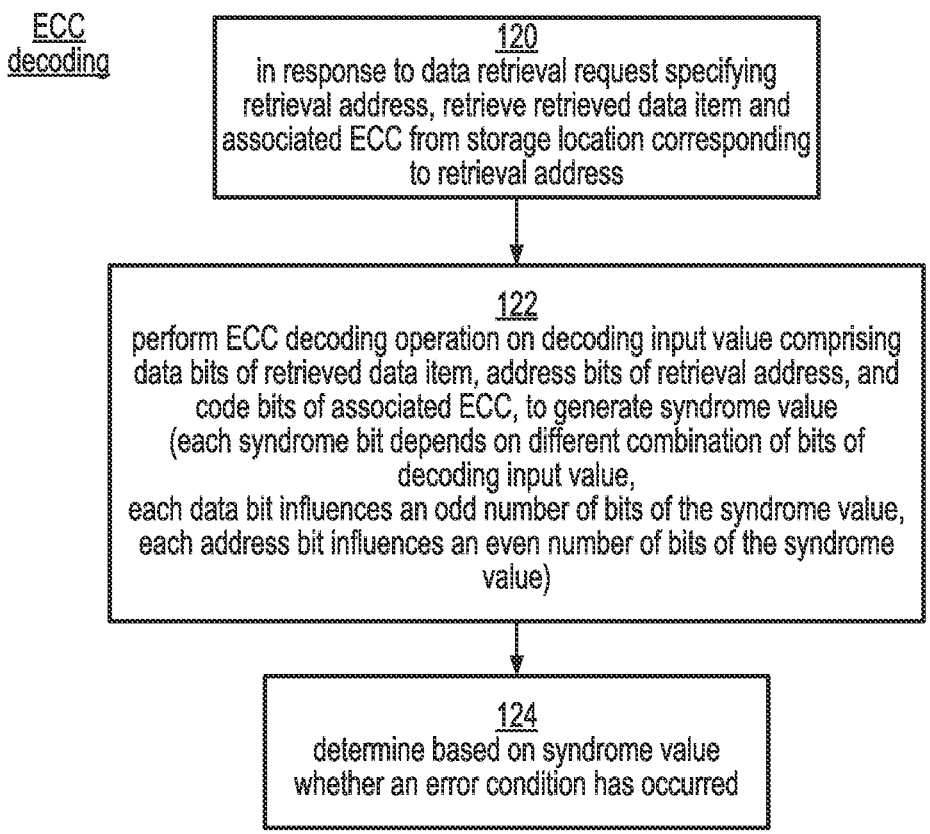
FIG. 14 illustrates in the method of ECC decoding to generate a syndrome value.

FIG. 14 illustrates a method of performing an ECC decoding operation using the ECC decoding circuitry 40. At step 120, in response to a data retrieval request specifying a retrieval address, the data retrieval circuitry 26 retrieves a retrieved data item 37 and an associated ECC 38 from a storage location corresponding to the retrieval address. At step 122, the ECC decoding circuitry 40 performs the ECC decoding operation on a decoding input value 39 comprising data bits 62 of the retrieved data item 37, code bits of the associated ECC 38 and address bits 64 of the retrieval address, to generate a syndrome value 70. Each syndrome bit depends on a different combination of bits of the decoding input value 39. Each data bit influences an odd number of bits of the syndrome value 70, while each address bit influences an even number of bits of the syndrome value 70. At step 124, ECC decoding circuitry 40 determines based on the syndrome value 70 whether an error condition has occurred.

Figure 15:
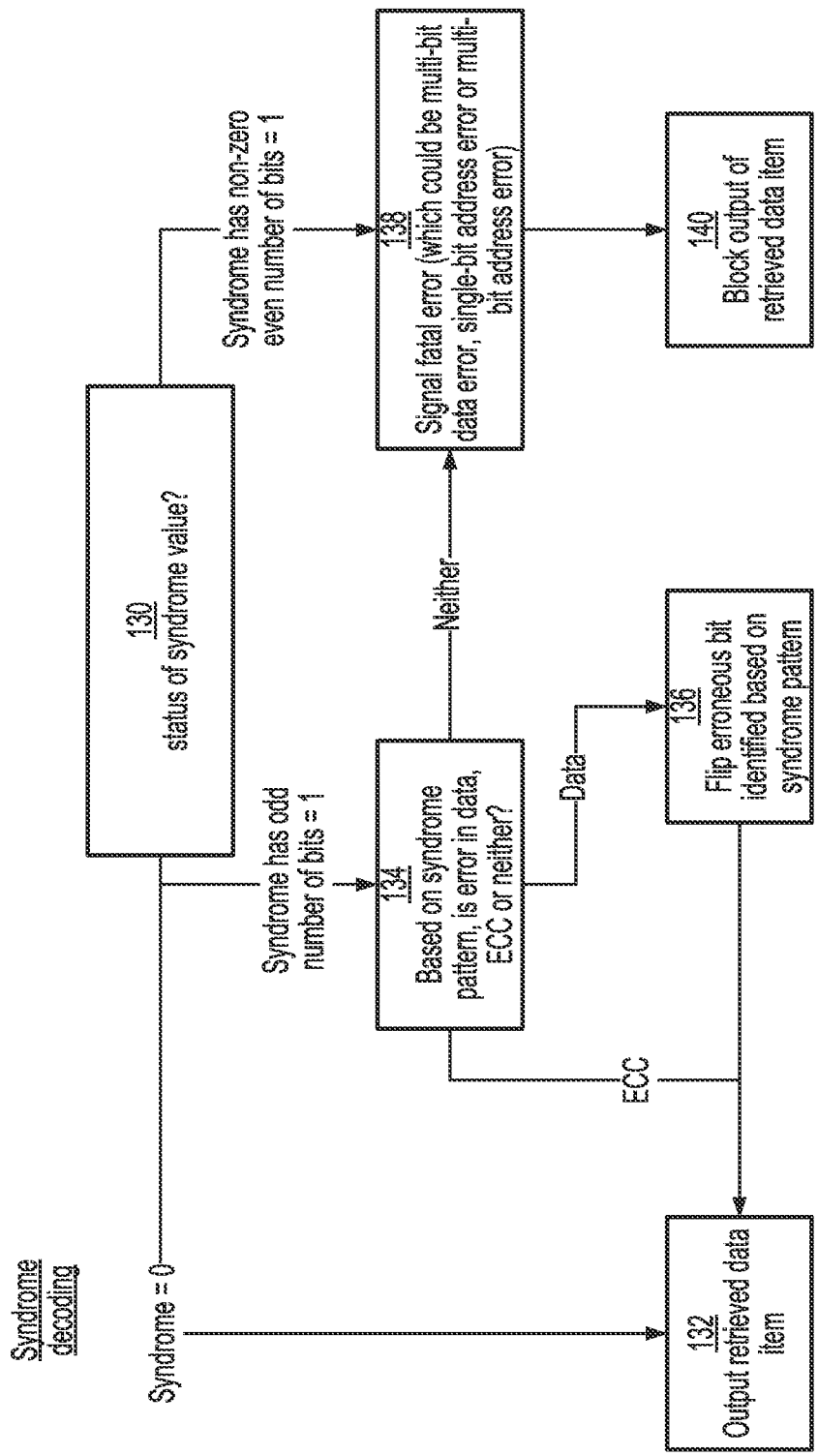
FIG. 15 illustrates decoding of the syndrome value.

FIG. 15 illustrates in more detail a method of decoding the syndrome value at step 124 to determine whether an error condition has occurred. At step 130, the ECC decoding circuitry 40 decodes the syndrome value to check the status of the syndrome value. If the syndrome value is equal to 0, then at step 132, the ECC decoding circuitry 40 detects that no error condition has occurred, and controls the retrieved data item to be output as a response to the data retrieval request.

If the syndrome value has an odd number of bits set to one, then at step 134, the ECC decoding circuitry 40 determines based on the syndrome pattern whether an error has occurred in the retrieved data item 37, the retrieved ECC 38, or neither data item nor ECC. If the syndrome value corresponds to one of the column values of the parity check matrix H which corresponds to one of the data bits, then a single-bit data error has occurred in that data bit, and so at step 136 the ECC decoding circuitry controls correction of the erroneous bit by flipping the state of the erroneous bits which is identified based on the syndrome pattern. If a correction is made to flip an erroneous bit, the modified retrieved data (after the correction) is output at step 132.

If the syndrome value corresponds to one of the column values of the parity check matrix H which corresponds to one of the ECC bits, then the error is located in that ECC bit, and so there is no need for any data bit correction as the retrieved data item has been found to be correct. Therefore, at step 132 the retrieved data item can be output unchanged. On the other hand, if the odd-weighted syndrome value does not correspond to any of the column values used for data bits or code bits (which can occur if an ECC scheme supporting a certain maximum number of data bits is used to protect a data item with fewer bits), then at step 138 a fatal error is signalled.

Also, if the syndrome value has a non-zero even number of bits set to 1, then at step 138 a fatal error is signalled. The syndrome value having a non-zero even number of bits set to 1 could occur either due to a multi-bit data error, or due to a single-bit address error, or due to a multi-bit address error. An error signal 42 is output, e.g. to trigger an interrupt to cause an interrupt handler (in software) to respond to the error. At step 140, the retrieved data item is blocked from being output.

Address Digest Computation

Figure 16:
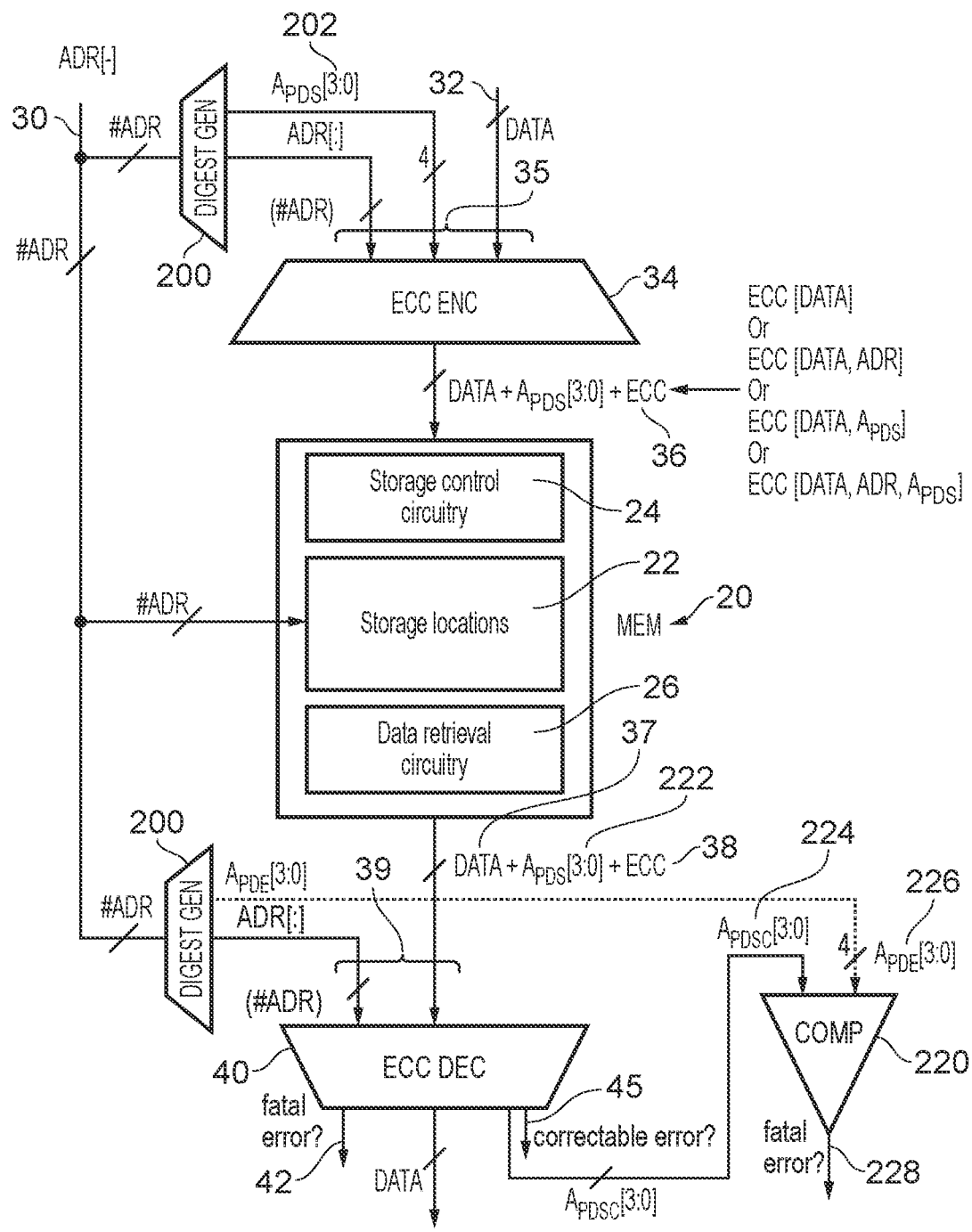
FIG. 16 illustrates an example of address digest generation and checking.

FIG. 16 illustrates a further example, which supports address digest computation and checking to provide further protection against address decoder errors. Features which correspond to those of FIG. 2 are shown with the same reference numerals as in FIG. 2, and unless otherwise stated below, are the same as described with respect to the earlier examples. Hence, requests to store a data item to the storage 20 and retrieve a data item from the storage 20 are performed in a similar way to that discussed earlier, with ECC encoding/decoding circuitry 34, 40 being used to generate and check ECCs to protect against random errors affecting the stored information.

The example of FIG. 16 also comprises address digest generation circuitry 200 which, at the time of a write operation to store a data item to a storage location associated with a storage target address, generates an address digest 202 based on some or all of the bits of the storage address. The address digest 202 can be regarded as a "summary" or "digest" of the address, in that it provides a more concise representation of properties of the address, but has fewer bits than the number of bits of the address used to compute the address digest 202.

Figure 17:
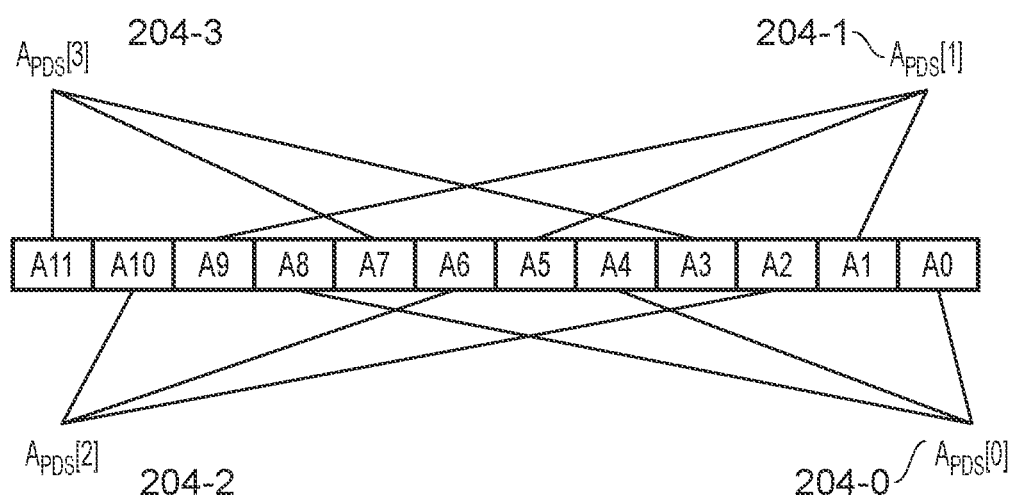
FIG. 17 illustrates interleaving of the bits of the address used to compute each parity bit of the address digest.

FIG. 17 shows an example of determination of the address digest 202 from the address. The address digest 202 comprises a number of digest indicators 204, each determined from a corresponding combination of bits of the address. For example, each digest indicator 204 can be a parity value representing parity of the corresponding combination of bits. The parity computation can be computed according to either odd parity or even parity depending on design choice. For example, each address digest indicator 204 may be calculated based on combining each of the corresponding combination of bits using either an XOR or XNOR function (e.g. $A_{PDS}[0]$=A0 XOR A4 XOR A8 in the example of FIG. 17 with an XOR parity computation function—XNOR could be used instead of XOR).

The positions of bits considered for each digest indicator 204 are interleaved with each other. In the specific example of FIG. 17 applied to 12 bits of an address, digest indicator 204-0 is computed from bits A0, A4, A8; digest indicator 204-1 is computed from bits A1, A5, A9; digest indicator 204-2 is computed from bits A2, A6, A10; and digest indicator 204-3 is computed from bits A3, A7, A11. It will be appreciated that the specific positions of bits considered for each digest indicator 204 may depend on the total number of digest indicators 204 provided and the number of address bits considered for the address digest.

Interleaving the positions of the address bits used for each digest indicator 204 can be helpful to increase robustness against errors, because the design of address decoders may be such that a single source of error may be more likely to affect adjacent bits of the address than bits separated by a number of intervening bits, since the processing of adjacent bits may be performed by hardware circuit logic which is more localized than hardware circuit logic processing bits separated by a number of intervening bits of the address. Hence, the probability of a single source of error simultaneously affecting decoding of bits further apart in magnitude can be relatively low, so by combining those further apart bits into a single digest indicator, this can help make the digest more concise without any significant reduction in error detection capability.

In particular, the arrangement of the combination of bits used for each digest indicator may be aligned with the way in which an address decoder (provided as part of the storage control circuitry 24 and/or data retrieval circuitry 26) processes bits of the address to select which word lines are asserted to select specific storage locations of the memory 20 for writing/reading.

Figure 18:
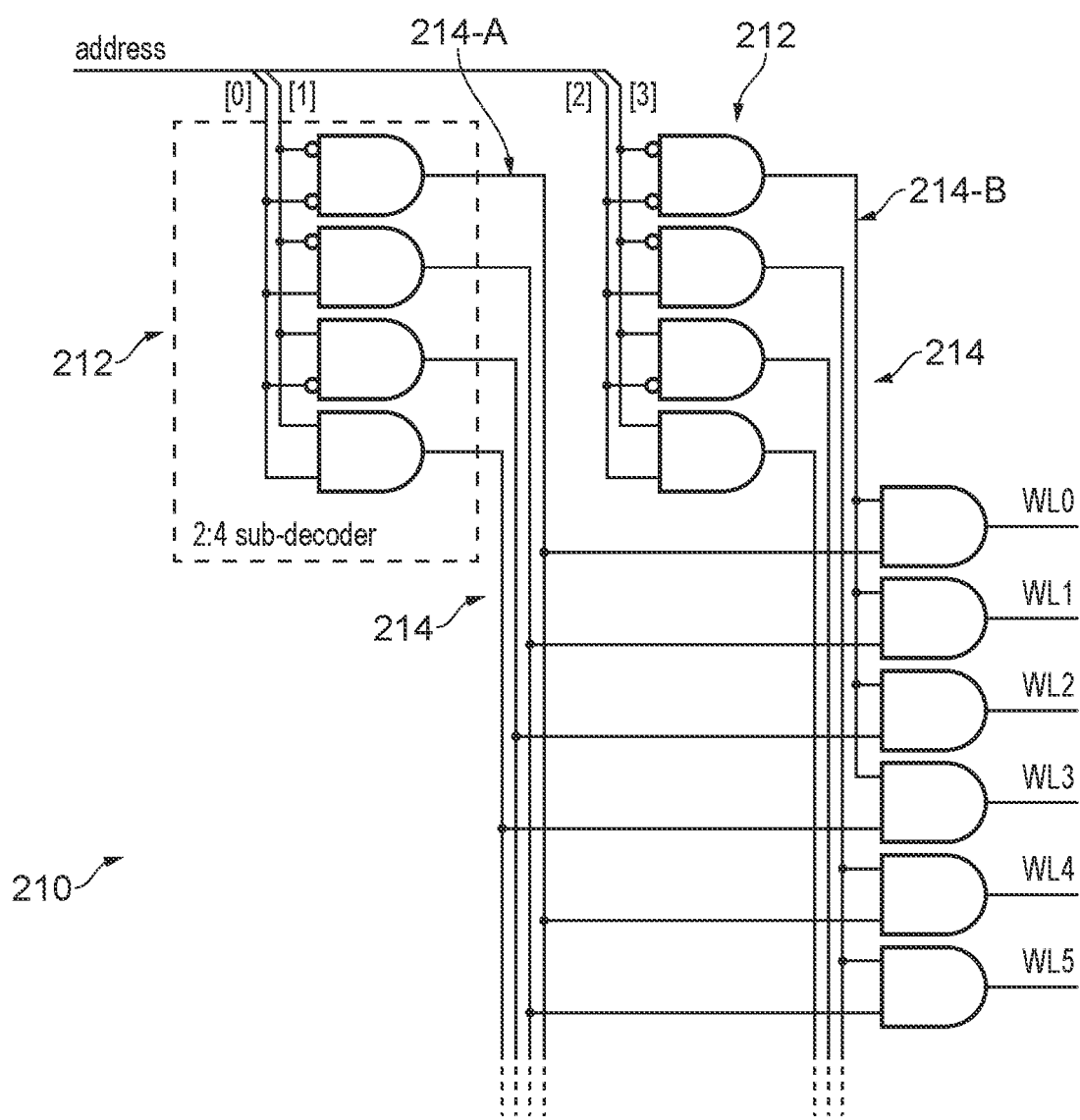
FIG. 18 illustrates an example of hierarchical address decoding using sub-decoder circuits.

As shown in FIG. 18, an address decoder 210 may have a hierarchical design split into a number of sub-decoder circuits 212 each for decoding a respective subset of bits of the address. Each sub-decoder is an $N:2^N$ sub-decoder which takes N bits of the address and generates $2^N$ sub-decoder output signals 214 representing the value of the N bits in a one-hot representation (so only one of the $2^N$ sub-decoder output signals 214 is asserted (logical 1) for a given sub-decoder circuit 212, and the other sub-decoder output signals 214 are deasserted (logical 0) for that sub-decoder). In this example, each sub-decoder circuit 212 is a 2:4 sub-decoder which generates 4 sub-decoder output signals 214 representing in one-hot form the value of the corresponding 2 address bits provided to that sub-decoder. The sub-decoder output signals 214 from each sub-decoder circuit 212 are then combined by a set of AND gates to generate word line signals WL for selecting the corresponding storage locations corresponding to each possible value of the address. In this example, for a 4-bit address there are 16 word line signals WL0-WL15 (only 6 of which, WL0-WL5, are indicated in FIG. 18 for conciseness). Each word line signal is generated by an AND gate which combines together the relevant sub-decoder output signals 214 from each sub-decoder which would be asserted if the value of the address corresponded to that word line (e.g. for an address 0b0000, WL0 is asserted because the sub-decoders 212 asserted both sub-decoder output signals 214-A and 214-B corresponding to bits 0 and 1 being 0b00 and bits 2 and 3 also being 0b00).

This example shows 2:4 sub-decoders, but other examples may use 3:8 or 4:16 sub-decoders, for instance. It will be appreciated that for larger addresses, there may be a greater number of sub-decoders than 2. In general, the hierarchical design of address decoder using sub-decoders can make the design simpler to implement than a single monolithic decoding of the full address, and make the address decoder design more scalable to different address sizes.

It can be helpful to select the positions of the bits considered for each digest indicator 204 so that, for a given digest indicator 204, each bit combined to form that digest indicator 204 is decoded by a different sub-decoder circuit 212 of the address decoder 210. This is because it is relatively unlikely that a single source of error affects the operation of more than one sub-decoder circuit 212, but a single source of error could affect the decoding of the group of bits handled by one sub-decoder. Hence, if multiple bits from one sub-decoder were combined for generating the same digest indicator, there could be a risk that the errors in handling those bits could cancel each other out in the parity computation so as to provide an undetectable error. In contrast, the probability of a single source of error affecting the decoding of one bit handled by one sub-decoder 212 and another bit handled by another sub-decoder 212 may be very low. Hence, the address digest can be made more concise (while still maintaining appropriate error detection capability) by combining bits decoded by different sub-decoders 212 into a single digest indicator (parity bit).

Hence, it will be appreciated that, while in general it can be helpful to interleave the bit positions of the bits combined for each digest indicator 204 as shown in FIG. 17, the 4-bit alternating sequence of FIG. 17 is just one example, and other examples may use a different interleaving pattern depending on the sub-decoder implementation used for the address decoder 210.

Returning to discussion of FIG. 16, when the data item is stored to the storage location 22 corresponding to the store target address, the corresponding address digest 202 computed by digest generation circuitry 200 is also stored to that location. Also, an ECC 36 may be generated by the ECC encoding circuitry 34 and stored along with the data item 32 and the address digest 202. As indicated in FIG. 16, the ECC could be computed from any of:
1. data bits of the data item 32 alone (so the ECC does not depend on either the address itself, or the address digest 202)
2. data bits of the data item 32 and address bits of the address (independent of the address digest bits of the address digest 202)
3. data bits of the data item 32 and address digest bits of the address digest 202 (not based directly on the address bits of the address, although there is an indirect dependency of the ECC on the address as the ECC 36 depends on the address digest 202 and the address digest 202 depends on the address); or
4. data bits of the data item 32, address digest bits of the address digest 202, and address bits of the address.

For examples 3 and 4 which include the address digest bits 202 in the encoding input value 35 for the ECC encoding operation, the address digest bits 202 can be treated as additional "data bits" when applying one of the generator matrices G described above in the examples of FIG. 5 or 7.

For examples 2 and 4 which include the address bits of the address in the encoding input value 35, the address digest bits 202 can be treated either as additional "data bits" (if using a standard Hsiao generator matrix as in FIG. 5) or can be treated as special address bits with even-weighted columns of the generator matrix, if the approach shown in FIG. 7 is used. Folding the address and/or address digest into the ECC computation can further improve error detection capability, but even if the address and/or address digest are not considered for ECC computation, storing the address digest alongside the data and checking it on readout of the data item can provide an improvement in detection of address decoder errors compared to an approach not supporting the address digest computation.

On retrieval of a data item from the storage 20, the data retrieval circuitry 26 retrieves a retrieved data item 37, ECC 38 and retrieved address digest 222 from the storage location determined based on a retrieval address. The ECC decoding circuitry 40 decodes the ECC to generate a syndrome value, using the ECC decoding techniques as discussed earlier. If the address digest is folded into the ECC scheme, then it is treated similar to the data bits mentioned earlier, so any single-bit address digest errors detected from the syndrome value can be corrected by flipping the erroneous bit (with optional reporting of a correctable error 45 as mentioned earlier), while multi-bit address digest errors (or errors affecting one address digest bit and one data bit) may trigger signalling of a fatal error 42.

In addition to any error detection based on the syndrome value, address digest error checking circuitry 220 is also provided to compare a post-correction version 224 of the retrieved address digest 222 with a retrieval address digest 226 computed by the digest generation circuitry 200 based on the retrieval address using a corresponding digest generation scheme to the one used to generate the address digest 202 when storing data to the storage 20. If a mismatch is detected between the post-correction version 224 of the retrieved address digest 222 and the retrieval address digest 226, a fatal error 228 is signalled. While the fatal error signal 228 asserted by address digest error checking circuitry 220 is shown separately from the fatal error signal 42 asserted by ECC decoding circuitry 42 when an uncorrectable error is detected in the ECC decoding operation using the syndrome value, in other examples a single fatal error signal could be asserted for both causes of fatal error. Some implementations may provide an encoding of the fatal error signal(s) which differentiates whether the cause of the error is an ECC decoding error or a mismatch in the address digest comparison, while other implementations may have a single encoding of fatal error reporting that combines both causes of error.

The address digest error checking circuitry 220 helps to detect further address decoding errors which cannot be detected using the ECC 38 alone. For example, if the address decoder functioned correctly at the time of storing a data item to the storage 20, and there has been no subsequent bit flip caused by a random error affecting the storage cells storing the data item 37, ECC 38 or stored address digest 222, then the ECC decoder 40 would signal no error as one would expect the ECC 38 code bits to match the stored data item 37 and stored address digest 222. Folding address bits into the ECC computation can protect against some address decoder errors, but there may be a limit to how many address bits can be considered for larger memories with a relatively large address space, so the ECC scheme might not detect all address decoder errors. An address decoder error on retrieving the data from the storage 20 could cause the data item 37, ECC 38 and address digest 222 to be read from a storage location that does not actually correspond to the retrieval address provided for the retrieval operation—if so then the ECC detection scheme might still match and not detect the error. The comparison provided by the address digest error checking circuitry 220 checks whether the stored address digest 222 (corrected if required based on the ECC) corresponds to the retrieval address digest 226, so that such address decoder errors can be detected.

Figure 19:
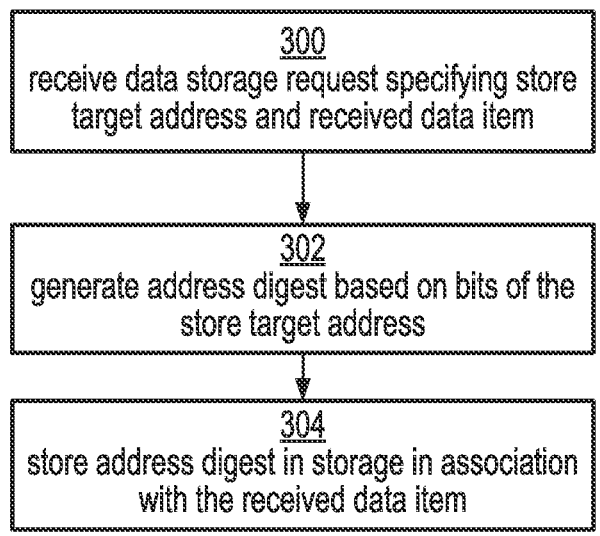
FIG. 19 illustrates a method of address digest generation.

FIG. 19 illustrates a method of address digest generation. At step 300, a data storage request is received specifying a store target address and a received data item. At step 302, the address digest generating circuitry 200 generates an address digest 202 based on some or all bits of the store target address. At step 304, the address digest is stored to the storage 20 in association with the received data item (at a location determined by the address decoder 210 based on the store target address).

Figure 20:
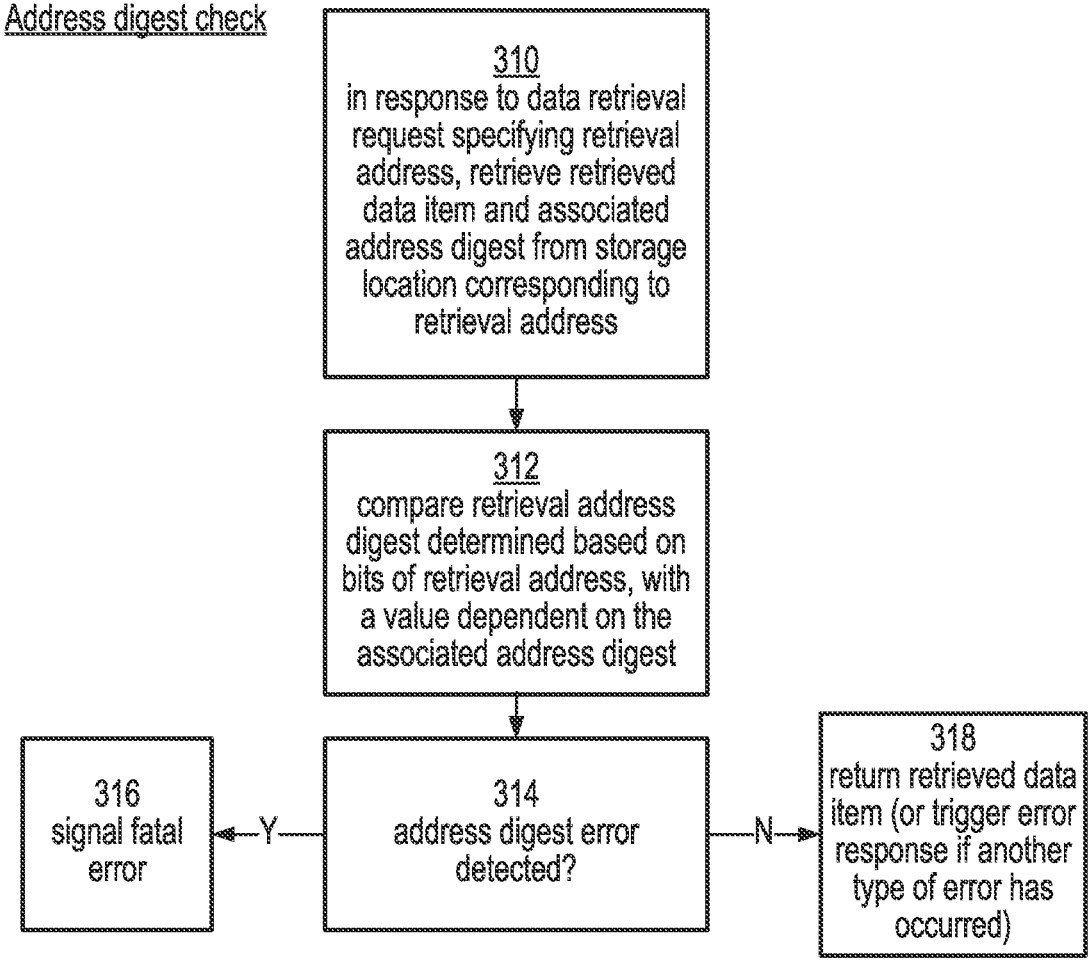
FIG. 20 illustrates a method of address digest checking.

FIG. 20 illustrates a method of address digest checking. At step 310, in response to a data retrieval request specifying a retrieval address, the data retrieval circuitry 26 retrieves a retrieved data item 37 and an associated address digest 222 from a storage location determined by the address decoder 210 based on the retrieval address. At step 312, the address digest error checking circuitry 220 compares a retrieval address digest 226 determined based on bits of the retrieval address with a value 224 dependent on the associated address digest 222. For example, the value 224 could be either the associated address digest 222 itself (if no ECC error is detected) or a corrected version of the associated address digest 222 (if a correctable error in the address digest 222 was detected using the ECC and corrected by flipping an erroneous bit of the retrieved address digest 222). At step 314, the address digest error checking circuitry 220 determines whether an address digest error is detected (the error may be detected if there is a mismatch between the retrieval address digest 226 and the value 224 dependent on the associated address digest 222 retrieved from the storage 20). If an address digest error is detected, then at step 316 a fatal error 228 is signalled. If no address digest error is detected, then the retrieved data item can be returned, or alternatively an error response may be triggered if another type of error has occurred (e.g. an ECC decoding error detected by the ECC decoding circuitry 40).

Figure 21:
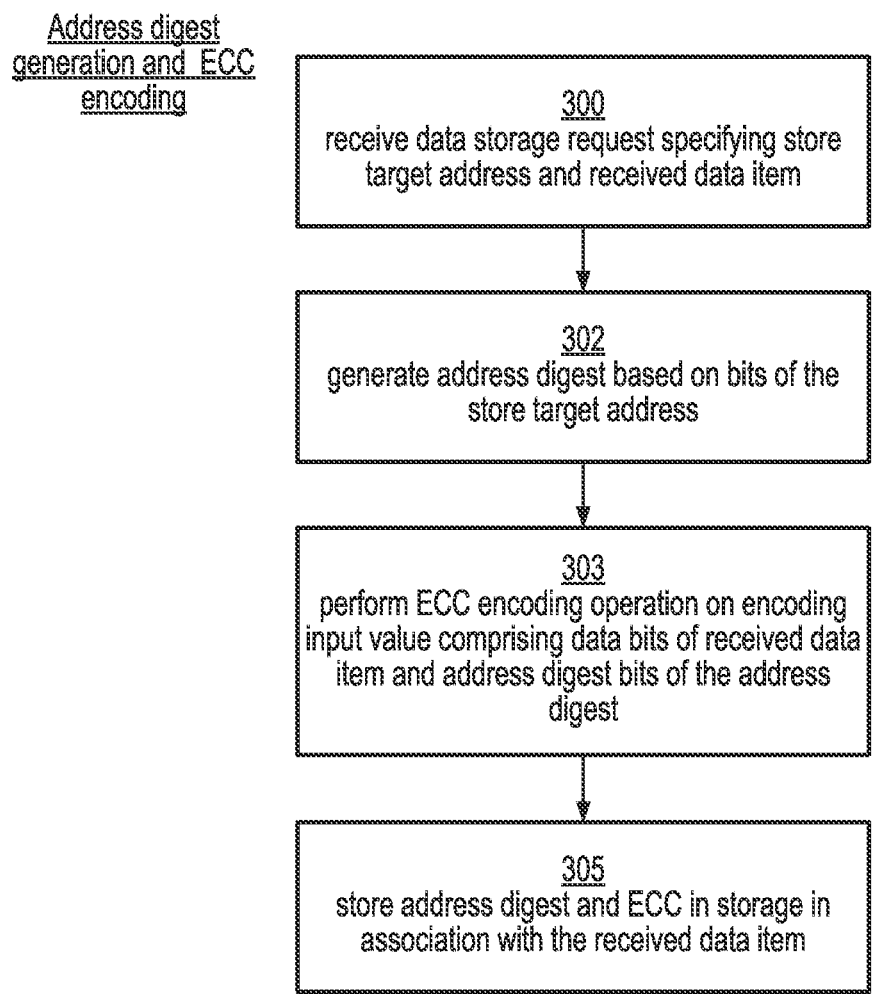
FIG. 21 illustrates a method of address digest generation and ECC encoding.
Figure 22:
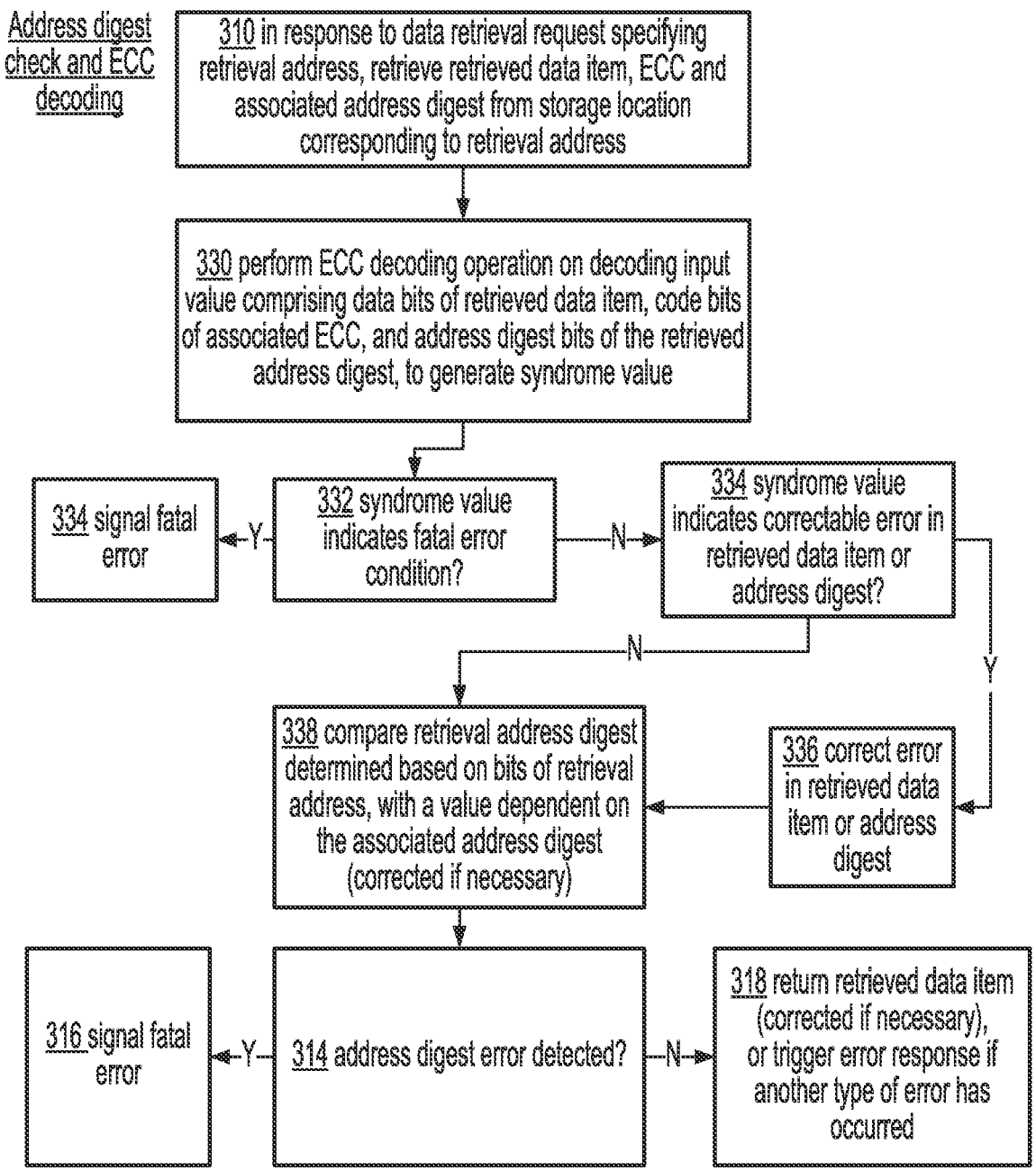
FIG. 22 illustrates a method of address digest checking and ECC decoding.

FIGS. 21 and 22 illustrate further examples of methods of address digest generation and checking, in a case where the address digest is also folded into ECC encoding/decoding operations. FIG. 21 shows the address digest generation and ECC encoding operations. Steps 300 and 302 are the same as in FIG. 19. At step 303 of FIG. 21, the ECC encoding circuitry 34 performs an ECC encoding operation on an encoding input value comprising (at least) data bits of the received data item and address digest bits of the address digest (as mentioned above, it is also possible to fold in some address bits of the store target address directly). The address digest bits are treated similar to the data bits in the ECC generation examples shown earlier (with odd-weighted columns of the G matrix). At step 305, the storage control circuitry 24 stores, to a location selected by the address decoder 210 based on the store target address, the received data item 32, the address digest 202, and the ECC 36 generated in the ECC encoding operation.

FIG. 22 illustrates the address digest checking and ECC encoding operations. FIG. 310 of FIG. 22 is as in FIG. 20, except that, as well as the retrieved data item and associated address digest, the associated ECC is also retrieved from the storage location corresponding to the retrieval address. At step 330 the ECC decoding circuitry 40 performs the ECC decoding operation on a decoding input value 39 comprising data bits 62 of the retrieved data item 37 (the data bits 62 could be all bits of the data item 37 or could be a subset of bits of the data item 37), code bits of the associated ECC 38 and address digest bits of the retrieved address digest 222 (and in some cases address bits 64 of the retrieval address may also be considered in the decoding input value 39), to generate a syndrome value 70. The address digest bits are treated similar to the data bits in the ECC decoding examples shown earlier (with odd-weighted columns of the H matrix). At step 332 of FIG. 22, the ECC decoding circuitry 40 determines whether the syndrome value 70 indicates a fatal error condition (e.g. single bit address error or multi-bit data/address digest error), and if so a fatal error 42 is signalled at step 333. If there is no fatal error, but the syndrome value is detected at step 334 as indicating a correctable error in the retrieved data item or the address digest, then at step 336 the error is corrected by flipping an erroneous bit in the retrieved data item or address digest (the location of the erroneous bit being determined based on the specific encoding of the syndrome value 70).

At step 338, the address digest error checking circuitry 220 compares a retrieval address digest 226 determined based on bits of the retrieval address with a value 224 dependent on the associated address digest 222. For example, the value 224 could be either the associated address digest 222 itself (if no ECC error is detected) or a corrected version of the associated address digest 222 (if a correctable error in the address digest 222 was detected using the ECC and corrected at step 336 by flipping an erroneous bit of the retrieved address digest 222). Steps 314, 316, 318 are then the same as in FIG. 20, so if a mismatch is detected in the comparison at step 338, a fatal error is signalled and otherwise the retrieved data item can be returned (unless another cause of error has arisen).

Concepts described herein may be embodied in a system comprising at least one packaged chip. The apparatus described earlier is implemented in the at least one packaged chip (either being implemented in one specific chip of the system, or distributed over more than one packaged chip). The at least one packaged chip is assembled on a board with at least one system component. A chip-containing product may comprise the system assembled on a further board with at least one other product component. The system or the chip-containing product may be assembled into a housing or onto a structural support (such as a frame or blade).

Figure 23:
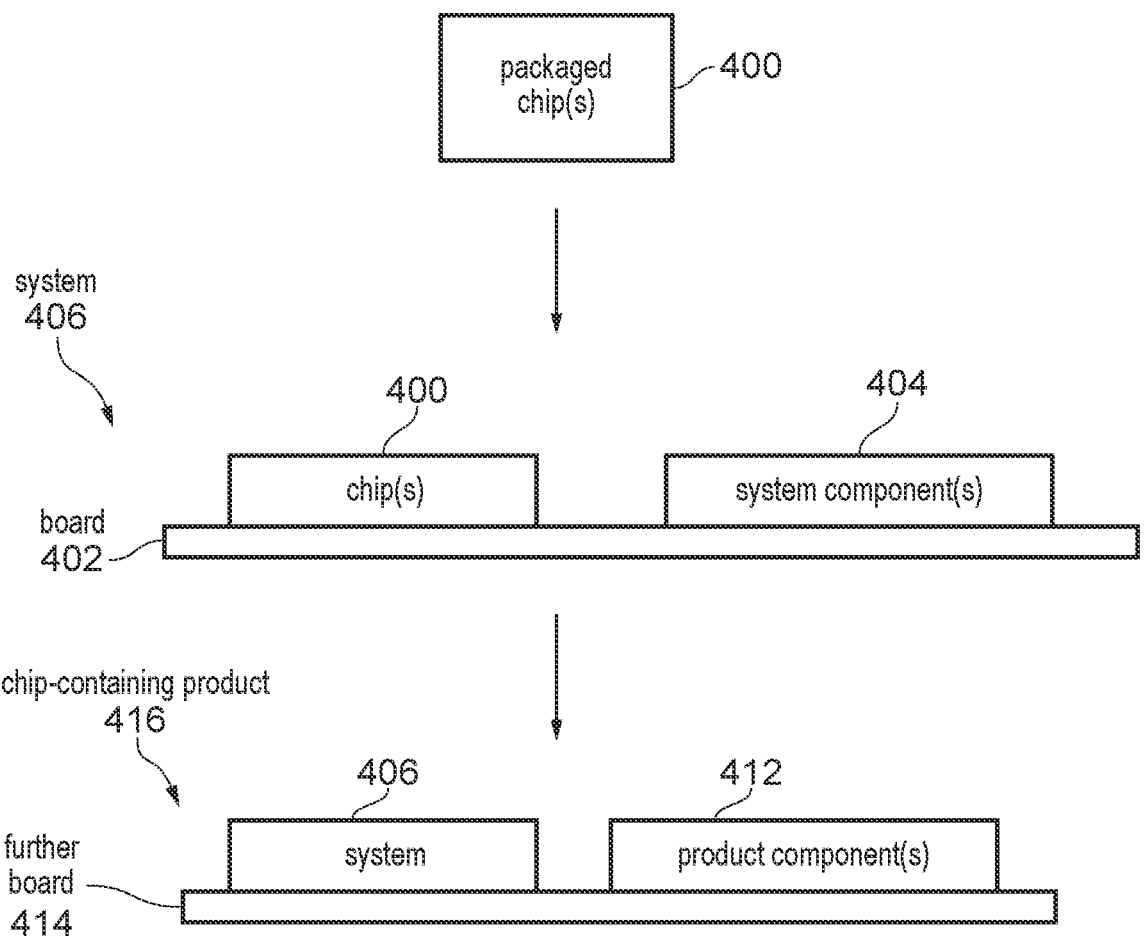
FIG. 23 illustrates a system and a chip-containing product.

As shown in FIG. 23, one or more packaged chips 400, with the apparatus described above implemented on one chip or distributed over two or more of the chips, are manufactured by a semiconductor chip manufacturer. In some examples, the chip product 400 made by the semiconductor chip manufacturer may be provided as a semiconductor package which comprises a protective casing (e.g. made of metal, plastic, glass or ceramic) containing the semiconductor devices implementing the apparatus described above and connectors, such as lands, balls or pins, for connecting the semiconductor devices to an external environment. Where more than one chip 400 is provided, these could be provided as separate integrated circuits (provided as separate packages), or could be packaged by the semiconductor provider into a multi-chip semiconductor package (e.g. using an interposer, or by using three-dimensional integration to provide a multi-layer chip product comprising two or more vertically stacked integrated circuit layers).

In some examples, a collection of chiplets (i.e. small modular chips with particular functionality) may itself be referred to as a chip. A chiplet may be packaged individually in a semiconductor package and/or together with other chiplets into a multi-chiplet semiconductor package (e.g. using an interposer, or by using three-dimensional integration to provide a multi-layer chiplet product comprising two or more vertically stacked integrated circuit layers).

The one or more packaged chips 400 are assembled on a board 402 together with at least one system component 404. For example, the board may comprise a printed circuit board. The board substrate may be made of any of a variety of materials, e.g. plastic, glass, ceramic, or a flexible substrate material such as paper, plastic or textile material. The at least one system component 404 comprise one or more external components which are not part of the one or more packaged chip(s) 400. For example, the at least one system component 404 could include, for example, any one or more of the following: another packaged chip (e.g. provided by a different manufacturer or produced on a different process node), an interface module, a resistor, a capacitor, an inductor, a transformer, a diode, a transistor and/or a sensor.

A chip-containing product 416 is manufactured comprising the system 406 (including the board 402, the one or more chips 400 and the at least one system component 404) and one or more product components 412. The product components 412 comprise one or more further components which are not part of the system 406. As a non-exhaustive list of examples, the one or more product components 412 could include a user input/output device such as a keypad, touch screen, microphone, loudspeaker, display screen, haptic device, etc.; a wireless communication transmitter/receiver; a sensor; an actuator for actuating mechanical motion; a thermal control device; a further packaged chip; an interface module; a resistor; a capacitor; an inductor; a transformer; a diode; and/or a transistor. The system 406 and one or more product components 412 may be assembled on to a further board 414.

The board 402 or the further board 414 may be provided on or within a device housing or other structural support (e.g. a frame or blade) to provide a product which can be handled by a user and/or is intended for operational use by a person or company.

The system 406 or the chip-containing product 416 may be at least one of: an end-user product, a machine, a medical device, a computing or telecommunications infrastructure product, or an automation control system. For example, as a non-exhaustive list of examples, the chip-containing product could be any of the following: a telecommunications device, a mobile phone, a tablet, a laptop, a computer, a server (e.g. a rack server or blade server), an infrastructure device, networking equipment, a vehicle or other automotive product, industrial machinery, consumer device, smart card, credit card, smart glasses, avionics device, robotics device, camera, television, smart television, DVD players, set top box, wearable device, domestic appliance, smart meter, medical device, heating/lighting control device, sensor, and/or a control system for controlling public infrastructure equipment such as smart motorway or traffic lights.

Concepts described herein may be embodied in computer-readable code for fabrication of an apparatus that embodies the described concepts. For example, the computer-readable code can be used at one or more stages of a semiconductor design and fabrication process, including an electronic design automation (EDA) stage, to fabricate an integrated circuit comprising the apparatus embodying the concepts. The above computer-readable code may additionally or alternatively enable the definition, modelling, simulation, verification and/or testing of an apparatus embodying the concepts described herein.

For example, the computer-readable code for fabrication of an apparatus embodying the concepts described herein can be embodied in code defining a hardware description language (HDL) representation of the concepts. For example, the code may define a register-transfer-level (RTL) abstraction of one or more logic circuits for defining an apparatus embodying the concepts. The code may define a HDL representation of the one or more logic circuits embodying the apparatus in Verilog, SystemVerilog, Chisel, or VHDL (Very High-Speed Integrated Circuit Hardware Description Language) as well as intermediate representations such as FIRRTL. Computer-readable code may provide definitions embodying the concept using system-level modelling languages such as SystemC and SystemVerilog or other behavioural representations of the concepts that can be interpreted by a computer to enable simulation, functional and/or formal verification, and testing of the concepts.

Additionally or alternatively, the computer-readable code may define a low-level description of integrated circuit components that embody concepts described herein, such as one or more netlists or integrated circuit layout definitions, including representations such as GDSII. The one or more netlists or other computer-readable representation of integrated circuit components may be generated by applying one or more logic synthesis processes to an RTL representation to generate definitions for use in fabrication of an apparatus embodying the invention. Alternatively or additionally, the one or more logic synthesis processes can generate from the computer-readable code a bitstream to be loaded into a field programmable gate array (FPGA) to configure the FPGA to embody the described concepts. The FPGA may be deployed for the purposes of verification and test of the concepts prior to fabrication in an integrated circuit or the FPGA may be deployed in a product directly.

The computer-readable code may comprise a mix of code representations for fabrication of an apparatus, for example including a mix of one or more of an RTL representation, a netlist representation, or another computer-readable definition to be used in a semiconductor design and fabrication process to fabricate an apparatus embodying the invention. Alternatively or additionally, the concept may be defined in a combination of a computer-readable definition to be used in a semiconductor design and fabrication process to fabricate an apparatus and computer-readable code defining instructions which are to be executed by the defined apparatus once fabricated.

Such computer-readable code can be disposed in any known transitory computer-readable medium (such as wired or wireless transmission of code over a network) or non-transitory computer-readable medium such as semiconductor, magnetic disk, or optical disc. An integrated circuit fabricated using the computer-readable code may comprise components such as one or more of a central processing unit, graphics processing unit, neural processing unit, digital signal processor or other components that individually or collectively embody the concept.

Some examples are set out in the following clauses:
1. An apparatus comprising:
   a storage configured to store data items associated with error correction codes (ECCs); and data retrieval circuitry responsive to a data retrieval request specifying a retrieval address to retrieve a retrieved data item and an associated ECC from a storage location corresponding to the retrieval address;
   ECC decoding circuitry to generate a syndrome value by performing an ECC decoding operation on a decoding input value comprising data bits of the retrieved data item, code bits of the associated ECC, and address bits of the retrieval address, and to determine based on the syndrome value whether an error condition has occurred, in which:
   each bit of the syndrome value depends on a different combination of bits of the decoding input value;
   for each data bit of the decoding input value, an odd number of bits of the syndrome value depend on that data bit; and
   for each address bit of the decoding input value, an even number of bits of the syndrome value depend on that address bit.
2. The apparatus according to clause 1, in which in response to the data bits of the retrieved data item and the code bits of the associated ECC having all bits equal to 0 or all bits equal to 1, the ECC decoding circuitry is configured to determine the syndrome value as indicating that an error condition has occurred.
3. The apparatus according to any of clauses 1 and 2, in which the ECC decoding circuitry is configured to determine at least one selected bit of the syndrome value independent of all of the address bits of the decoding input value.
4. The apparatus according to any of clauses 1 to 3, in which the ECC decoding circuitry is configured to determine each bit of the syndrome value by applying a parity checking function to a corresponding combination of bits of the decoding input value.
5. The apparatus according to clause 4, in which:
   for determining a first subset of bits of the syndrome value, the ECC decoding circuitry is configured to apply a first parity checking function; and
   for determining a second subset of bits of the syndrome value, the ECC decoding circuitry is configured to apply a second parity checking function.
6. The apparatus according to any of clauses 1 to 5, in which for each data bit of the decoding input value, a combination of bits of the syndrome value which depend on that data bit is a unique combination different from the combination of bits of the syndrome value which depend on any other data bit of the decoding input value.
7. The apparatus according to clause 6, in which the ECC decoding circuitry is configured to determine the syndrome value wherein, if for each data bit of the decoding input value the combination of bits of the syndrome value which depend on that data bit is logically represented as a column value with positions of 1s in the column value indicating which bits of the syndrome value depend on the given data bit, the exclusive XOR of column values for any two of the data bits of the decoding input value is different to the column value for any one of the data bits of the decoding input value.
8. The apparatus according to any of clauses 1 to 7, wherein the ECC decoding circuitry is responsive to detecting that the syndrome value comprises a non-zero even number of bits set to 1, to signal a fatal error in the requested data retrieval.
9. The apparatus according to clause 8, wherein the ECC decoding circuitry is responsive to said fatal error to block the outputting of the retrieved data item.
10. The apparatus according to any of clauses 1 to 9, wherein the ECC decoding circuitry is responsive to detecting that the syndrome value comprises one of a plurality of single-data-error-indicating values having an odd number of bits set to 1, to perform, based on the syndrome value, a correction operation on the retrieved data item, and to output a corresponding corrected data item.

11. The apparatus according to clause 10, wherein the ECC decoding circuitry is configured to perform the correction operation by:
   determining, based on the syndrome value, an erroneous bit of the retrieved data value; and
   flipping the erroneous bit.

12. The apparatus according to any of clauses 1 to 11, wherein the ECC decoding circuitry is responsive to the syndrome value having a zero value to determine that no error condition has occurred.

13. The apparatus according to any of clauses 1 to 12, comprising ECC encoding circuitry to receive a data item to be stored in the storage, the received data item having an associated address, and to perform an ECC encoding operation on an encoding input value comprising data bits of the received data item and address bits of the associated address, to generate a corresponding ECC to be stored to the storage in association with the received data value; wherein:
   for each data bit of the encoding input value, an odd number of bits of the corresponding ECC depend on that data bit; and
   for each address bit of the encoding input value, an even number of bits of the corresponding ECC depend on that address bit.

14. The apparatus according to clause 13, in which the ECC encoding circuitry is configured to generate the corresponding ECC according to an ECC encoding scheme which prevents a stored value, comprising the data bits of the received data item and a plurality of code bits of the corresponding ECC, having all bits equal to 0 or all bits equal to 1.

15. The apparatus according to any of clauses 13 and 14, in which the ECC encoding circuitry is configured to determine at least one selected bit of the corresponding ECC independent of all of the address bits of the encoding input value.

16. The apparatus according to any of clauses 13 to 15, in which the ECC encoding circuitry is configured to determine each bit of the corresponding ECC as a parity value indicative of parity of a corresponding combination of bits of the encoding input value.

17. The apparatus according to clause 16, in which:
   for a first subset of bits of the corresponding ECC, the ECC encoding circuitry is configured to apply a first parity determining function; and
   for a second subset of bits of the corresponding ECC, the ECC encoding circuitry is configured to apply a second parity determining function.

18. The apparatus according to any of clauses 13 to 17, in which for each data bit of the encoding input value, a combination of bits of the corresponding ECC which depend on that data bit is a unique combination different from the combination of bits of the syndrome value which depend on any other data bit of the decoding input value.

19. The apparatus according to clause 18, in which the ECC encoding circuitry is configured to determine the ECC wherein, if for each data bit of the encoding input value the combination of bits of the corresponding ECC which depend on that data bit is logically represented as a column value with positions of 1s in the column value indicating which bits of the corresponding ECC depend on the given data bit, the exclusive XOR of column values for any two of the data bits of the encoding input value is different to the column value for any one of the data bits of the encoding input value].

20. The apparatus according to any of clauses 13 to 19, wherein the ECC encoding circuitry is configured to:
   compute one or more parity bits associated with said associated address;
   perform the ECC encoding operation with the encoding input value also comprising the one or more parity bits, wherein for each of the one or more parity bits, an odd number of bits of the corresponding ECC depend on that parity bit; and
   store said one or more parity bits with the stored data item.

21. The apparatus according to any of clauses 1 to 19, wherein the data retrieval circuitry is configured to retrieve one or more stored parity bits from a storage location corresponding to the retrieval address; and
   the ECC decoding circuitry is configured to:
      perform the ECC decoding operation with the decoding input value also comprising the one or more stored parity bits, wherein for each of the one or more stored parity bits, an odd number of bits of the syndrome value depend on that stored parity bit;
      determine based on the syndrome value whether to correct the one or more stored parity bits; and
      determine whether to signal an error condition depending on a comparison of one or more corrected parity bits subject to any correction based on the syndrome value with one or more retrieval parity bits computed based on at least a portion of the retrieval address.

22. A system comprising:
   the apparatus of any of clauses 1 to 21, implemented in at least one packaged chip;
   at least one system component; and
   a board,
   wherein the at least one packaged chip and the at least one system component are assembled on the board.

23. A chip-containing product comprising the system of clause 22 assembled on a further board with at least one other product component.

24. A non-transitory computer-readable medium to store computer-readable code for fabrication of an apparatus comprising:
   a storage configured to store data items associated with error correction codes (ECCs); and
   data retrieval circuitry responsive to a data retrieval request specifying a retrieval address to retrieve a retrieved data item and an associated ECC from a storage location corresponding to the retrieval address;
   ECC decoding circuitry to generate a syndrome value by performing an ECC decoding operation on a decoding input value comprising data bits of the retrieved data item, address bits of the retrieval address and code bits of the associated ECC, and to determine based on the syndrome value whether an error condition has occurred, in which:
   each bit of the syndrome value depends on a different combination of bits of the decoding input value;
   for each data bit of the decoding input value, an odd number of bits of the syndrome value depend on that data bit; and
   for each address bit of the decoding input value, an even number of bits of the syndrome value depend on that address bit.

25. A method comprising:
   in response to a data retrieval request specifying a retrieval address, retrieving a retrieved data item and an associated error correction code (ECC) from a storage location corresponding to the retrieval address;
   generating a syndrome value by performing an ECC decoding operation on a decoding input value comprising data bits of the retrieved data item, address bits of the retrieval address and code bits of the associated ECC; and determining based on the syndrome value whether an error condition has occurred; in which:

each bit of the syndrome value depends on a different combination of bits of the decoding input value;

for each data bit of the decoding input value, an odd number of bits of the syndrome value depend on that data bit; and for each address bit of the decoding input value, an even number of bits of the syndrome value depend on that address bit.

26. An apparatus comprising:

a storage configured to store data items; and address digest generating circuitry responsive to a request to store a received data item to a location of the storage associated with a store target address, to generate an address digest based on a plurality of bits of the store target address, the address digest having fewer bits than the plurality of bits; wherein the storage is configured to store the address digest in association with the received data item.

27. The apparatus according to clause 26, in which the address digest comprises a plurality of digest indicators, each digest indicator dependent on a corresponding combination of bits of the store target address.

28. The apparatus according to clause 27, in which each digest indicator comprises a parity value indicative of parity of the corresponding combination of bits of the store target address.

29. The apparatus according to any of clauses 27 and 28, comprising address decoding circuitry to decode the store target address to select the location of the storage associated with the store target address;

the address decoding circuitry comprising a plurality of sub-decoder circuits, each sub-decoder circuit to decode a corresponding subset of bits from the store target address; and for a given digest indicator of the address digest, the corresponding combination of bits of the store target address comprises a plurality of bits of the store target address each decoded by a different sub-decoder circuit.

30. The apparatus according to any of clauses 27 to 29, in which:

the plurality of digest indicators comprise at least a first digest indicator dependent on a first corresponding combination of bits at first bit positions within the store target address, and a second digest indicator dependent on a second corresponding combination of bits at second bit positions within the store target address; and the first bit positions are interleaved with the second bit positions.

31. The apparatus according to any of clauses 26 to 30, comprising data retrieval circuitry responsive to a data retrieval request specifying a retrieval address to retrieve a retrieved data item and an associated address digest from a storage location corresponding to the retrieval address; and error checking circuitry to detect an error based on a comparison of:

a retrieval address digest determined based on a plurality of bits of the retrieval address; and a value dependent on the associated address digest retrieved by the data retrieval circuitry.

32. The apparatus according to any of clauses 26 to 31, comprising:

ECC (error correction code) encoding circuitry to perform an ECC encoding operation on an encoding input value comprising data bits of the received data item and address digest bits of the address digest, to generate an ECC to be stored to the storage in association with the received data item and the address digest.

33. The apparatus according to clause 32, in which the ECC encoding circuitry is configured to determine each bit of the ECC as a parity value indicative of parity of a respective combination of bits of the encoding input value.

34. The apparatus according to any of clauses 32 to 33, in which, in the ECC encoding operation:

each bit of the ECC generated in the ECC encoding operation depends on a different combination of bits of the encoding input value;

for each data bit of the encoding input value, an odd number of bits of the ECC depend on that data bit; and for each address digest bit of the encoding input value, an odd number of bits of the ECC depend on that address digest bit.

35. The apparatus according to clause 34, in which:

the encoding input value also comprises address bits of the store target address; and for each address bit of the encoding input value, an even number of bits of the ECC depend on that address bit.

36. The apparatus according to any of clauses 32 to 35, comprising:

data retrieval circuitry responsive to a data retrieval request specifying a retrieval address to retrieve a retrieved data item, an associated ECC and an associated address digest from a storage location corresponding to the retrieval address; and ECC decoding circuitry to generate a syndrome value by performing an ECC decoding operation on a decoding input value comprising data bits of the retrieved data item, code bits of the associated ECC, and address digest bits of the associated address digest, and to determine based on the syndrome value whether an error condition has occurred.

37. The apparatus of clause 36, comprising address digest comparison circuitry to determine whether to signal an error condition based on a comparison of:

a retrieval address digest determined based on a plurality of bits of the retrieval address; and a value dependent on the associated address digest retrieved by the data retrieval circuitry.

38. The apparatus of clause 37, in which the ECC decoding circuitry is configured to determine, based on the syndrome value, whether to correct the associated address digest retrieved by the data retrieval circuitry; and the value dependent on the associated address digest comprises the associated address digest subject to any correction based on the syndrome value.

39. The apparatus of any of clauses 37 and 38, in which the retrieval address digest comprises a plurality of digest indicators, each digest indicator dependent on a corresponding combination of bits of the retrieval address.

40. The apparatus of clause 39, in which each digest indicator comprises a parity value indicative of parity of the corresponding combination of bits of the retrieval address.

41. The apparatus of any of clauses 39 and 40, comprising address decoding circuitry to decode the retrieval target address to select the storage location corresponding to the retrieval address;

the address decoding circuitry comprising a plurality of sub-decoder circuits, each sub-decoder circuit to decode a corresponding subset of bits from the retrieval address; and for a given digest indicator of the retrieval address digest, the corresponding combination of bits of the retrieval address comprises a plurality of bits of the retrieval address each decoded by a different sub-decoder circuit.

42. The apparatus of any of clauses 39 to 41, in which:

the plurality of digest indicators comprise at least a first digest indicator dependent on a first corresponding combination of bits at first bit positions within the retrieval address, and a second digest indicator dependent on a second corresponding combination of bits at second bit positions within the retrieval address; and the first bit positions are interleaved with the second bit positions.

43. The apparatus of any of clauses 36 to 42, in which the ECC decoding circuitry is configured to determine each bit of the syndrome value as a parity value indicative of parity of a respective combination of bits of the decoding input value.

44. The apparatus of any of clauses 36 to 43, in which, in the ECC decoding operation:

each bit of the syndrome value generated in the ECC decoding operation depends on a different combination of bits of the decoding input value;

for each data bit of the decoding input value, an odd number of bits of the syndrome value depend on that data bit; and for each address digest bit of the decoding input value, an odd number of bits of the syndrome value depend on that address digest bit.

45. The apparatus according to clause 44, in which:

the decoding input value also comprises address bits of the retrieval address; and for each address bit of the decoding input value, an even number of bits of the syndrome value depend on that address bit.

46. The apparatus of any of clauses 36 to 45, in which the ECC decoding circuitry is responsive to detecting that the syndrome value comprises a non-zero even number of bits set to 1, to signal a fatal error in the requested data retrieval.

47. The apparatus according to any of clauses 36 to 46, wherein the ECC decoding circuitry is responsive to detecting that the syndrome value comprises one of a plurality of single-bit-error-indicating values having an odd number of bits set to 1, to perform, based on the syndrome value, a correction operation on the retrieved data item or the associated address digest, and to output a corresponding corrected data item or corrected address digest.

48. The apparatus according to clause 47, wherein the ECC decoding circuitry is configured to perform the correction operation by:

determining, based on the syndrome value, an erroneous bit of the retrieved data item or the associated address digest; and flipping the erroneous bit.

49. The apparatus according to any of clauses 36 to 48, wherein the ECC decoding circuitry is responsive to the syndrome value having a zero value to determine that no error condition has occurred.

50. A system comprising:

the apparatus of any of clauses 26 to 49, implemented in at least one packaged chip;

at least one system component; and a board, wherein the at least one packaged chip and the at least one system component are assembled on the board.

51. A chip-containing product comprising the system of clause 50 assembled on a further board with at least one other product component.

52. A non-transitory computer-readable medium to store computer-readable code for fabrication of an apparatus comprising:

a storage configured to store data items; and address digest generating circuitry responsive to a request to store a received data item to a location of the storage associated with a store target address, to generate an address digest based on a plurality of bits of the store target address, the address digest having fewer bits than the plurality of bits; wherein the storage is configured to store the address digest in association with the received data item.

53. A method comprising:

in response to a request to store a received data item to a location of storage associated with a store target address, generating an address digest based on a plurality of bits of the store target address, the address digest having fewer bits than the plurality of bits; and storing the received data item and the address digest to the location of the storage associated with the store target address.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

In the present application, lists of features preceded with the phrase "at least one of" mean that any one or more of those features can be provided either individually or in combination. For example, "at least one of: A, B and C" encompasses any of the following options: A alone (without B or C), B alone (without A or C), C alone (without A or B), A and B in combination (without C), A and C in combination (without B), B and C in combination (without A), or A, B and C in combination.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope of the invention as defined by the appended claims.

We claim:

1. An apparatus comprising:

a storage configured to store data items associated with error correction codes (ECCs); and data retrieval circuitry responsive to a data retrieval request specifying a retrieval address to retrieve a retrieved data item and an associated ECC from a storage location corresponding to the retrieval address;

ECC decoding circuitry to generate a syndrome value by performing an ECC decoding operation on a decoding input value comprising data bits of the retrieved data item, code bits of the associated ECC, and address bits of the retrieval address, and to determine based on the syndrome value whether an error condition has occurred, in which:

each bit of the syndrome value depends on a different combination of bits of the decoding input value;

for each data bit of the decoding input value, an odd number of bits of the syndrome value depend on that data bit; and for each address bit of the decoding input value, an even number of bits of the syndrome value depend on that address bit.

2. The apparatus according to claim 1, in which in response to the data bits of the retrieved data item and the code bits of the associated ECC having all bits equal to 0 or all bits equal to 1, the ECC decoding circuitry is configured to determine the syndrome value as indicating that an error condition has occurred.

3. The apparatus according to claim 1, in which the ECC decoding circuitry is configured to determine at least one selected bit of the syndrome value independent of all of the address bits of the decoding input value.

4. The apparatus according to claim 1, in which the ECC decoding circuitry is configured to determine each bit of the syndrome value by applying a parity checking function to a corresponding combination of bits of the decoding input value.

5. The apparatus according to claim 4, in which:

for determining a first subset of bits of the syndrome value, the ECC decoding circuitry is configured to apply a first parity checking function; and for determining a second subset of bits of the syndrome value, the ECC decoding circuitry is configured to apply a second parity checking function.

6. The apparatus according to claim 1, in which for each data bit of the decoding input value, a combination of bits of the syndrome value which depend on that data bit is a unique combination different from the combination of bits of the syndrome value which depend on any other data bit of the decoding input value.

7. The apparatus according to claim 1, wherein the ECC decoding circuitry is responsive to detecting that the syndrome value comprises a non-zero even number of bits set to 1, to signal occurring for the data retrieval request.

8. The apparatus according to claim 7, wherein the ECC decoding circuitry is responsive to said fatal error to block an outputting of the retrieved data item.

9. The apparatus according to claim 1, wherein the ECC decoding circuitry is responsive to detecting that the syndrome value comprises one of a plurality of single-data-error-indicating values having an odd number of bits set to 1, to perform, based on the syndrome value, a correction operation on the retrieved data item, and to output a corresponding corrected data item.

10. The apparatus according to claim 9, wherein the ECC decoding circuitry is configured to perform the correction operation by:

determining, based on the syndrome value, an erroneous bit of the retrieved data value; and flipping the erroneous bit.

11. The apparatus according to claim 1, wherein the ECC decoding circuitry is responsive to the syndrome value having a zero value to determine that no error condition has occurred.

12. The apparatus according to claim 1, comprising ECC encoding circuitry to receive a data item to be stored in the storage, the received data item having an associated address, and to perform an ECC encoding operation on an encoding input value comprising data bits of the received data item and address bits of the associated address, to generate a corresponding ECC to be stored to the storage in association with the received data value; wherein:

for each data bit of the encoding input value, an odd number of bits of the corresponding ECC depend on that data bit; and for each address bit of the encoding input value, an even number of bits of the corresponding ECC depend on that address bit.

13. The apparatus according to claim 12, wherein the ECC encoding circuitry is configured to:

compute one or more parity bits associated with said associated address;

perform the ECC encoding operation with the encoding input value also comprising the one or more parity bits, wherein for each of the one or more parity bits, an odd number of bits of the corresponding ECC depend on that parity bit; and store said one or more parity bits with the received data item.

14. The apparatus according to claim 1, wherein the data retrieval circuitry is configured to retrieve one or more stored parity bits from a storage location corresponding to the retrieval address; and the ECC decoding circuitry is configured to:

perform the ECC decoding operation with the decoding input value also comprising the one or more stored parity bits, wherein for each of the one or more stored parity bits, an odd number of bits of the syndrome value depend on that stored parity bit;

determine based on the syndrome value whether to correct the one or more stored parity bits; and determine whether to signal an error condition depending on a comparison of one or more corrected parity bits subject to any correction based on the syndrome value with one or more retrieval parity bits computed based on at least a portion of the retrieval address.

15. A system comprising:

the apparatus of claim 1, implemented in at least one packaged chip;

at least one system component; and a board, wherein the at least one packaged chip and the at least one system component are assembled on the board.

16. A chip-containing product comprising the system of claim 15 assembled on a further board with at least one other product component.

17. A non-transitory computer-readable medium to store computer-readable code for fabrication of an apparatus comprising:

a storage configured to store data items associated with error correction codes (ECCs); and data retrieval circuitry responsive to a data retrieval request specifying a retrieval address to retrieve a retrieved data item and an associated ECC from a storage location corresponding to the retrieval address;

ECC decoding circuitry to generate a syndrome value by performing an ECC decoding operation on a decoding input value comprising data bits of the retrieved data item, address bits of the retrieval address and code bits of the associated ECC, and to determine based on the syndrome value whether an error condition has occurred, in which:

each bit of the syndrome value depends on a different combination of bits of the decoding input value;

for each data bit of the decoding input value, an odd number of bits of the syndrome value depend on that data bit; and for each address bit of the decoding input value, an even number of bits of the syndrome value depend on that address bit.

18. A method comprising:

in response to a data retrieval request specifying a retrieval address, retrieving a retrieved data item and an associated error correction code (ECC) from a storage location corresponding to the retrieval address;

degenerating, by ECC decoding circuitry, a syndrome value by performing an ECC decoding operation on a decoding input value comprising data bits of the retrieved data item, address bits of the retrieval address and code bits of the associated ECC; and determining based on the syndrome value whether an error condition has occurred; in which:

each bit of the syndrome value depends on a different combination of bits of the decoding input value;

for each data bit of the decoding input value, an odd number of bits of the syndrome value depend on that data bit; and for each address bit of the decoding input value, an even number of bits of the syndrome value depend on that address bit.

* * * * *